(12) United States Patent
Takasumi et al.

(10) Patent No.: US 10,021,362 B2
(45) Date of Patent: Jul. 10, 2018

(54) IMAGE PROCESSING APPARATUS, NON-TRANSITORY COMPUTER-READABLE MEDIUM STORING COMPUTER PROGRAM, AND IMAGE PROCESSING METHOD USING HYSTERESIS TO CALCULATE GAIN

(71) Applicant: Olympus Corporation, Hachioji-shi, Tokyo (JP)

(72) Inventors: Shinya Takasumi, Akiruno (JP); Tatsuya Kino, Kodaira (JP); Takuya Matsunaga, Akiruno (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/375,334

(22) Filed: Dec. 12, 2016

(65) Prior Publication Data

US 2017/0180620 A1 Jun. 22, 2017

(30) Foreign Application Priority Data

Dec. 22, 2015 (JP) .................................. 2015-250035

(51) Int. Cl.
*H04N 9/73* (2006.01)
*H04N 5/232* (2006.01)

(52) U.S. Cl.
CPC ............. *H04N 9/735* (2013.01); *H04N 5/232* (2013.01)

(58) Field of Classification Search
CPC ............. H04N 9/735; H04N 9/73; H04N 9/64; H04N 5/234
See application file for complete search history.

(56) References Cited

U.S. PATENT DOCUMENTS

| 7,330,206 | B2 | 2/2008 | Nishimura | |
|---|---|---|---|---|
| 7,619,680 | B1* | 11/2009 | Bingle | B60R 11/04 |
| | | | | 348/342 |
| 8,054,346 | B2* | 11/2011 | Numata | H04N 5/217 |
| | | | | 348/222.1 |
| 8,558,949 | B2* | 10/2013 | Sato | H04N 5/145 |
| | | | | 345/591 |
| 9,788,394 | B2* | 10/2017 | Van Der Poel | H05B 37/0218 |
| 2003/0030743 | A1* | 2/2003 | Takahashi | H04N 5/235 |
| | | | | 348/362 |
| 2004/0201718 | A1* | 10/2004 | Poplin | H04N 5/235 |
| | | | | 348/222.1 |
| 2007/0081102 | A1* | 4/2007 | Ramanath | H04N 5/58 |
| | | | | 348/602 |

(Continued)

FOREIGN PATENT DOCUMENTS

JP 2003-348601 12/2003

*Primary Examiner* — Nicholas Giles
(74) *Attorney, Agent, or Firm* — John C. Pokotylo; Pokotylo Patent Services

(57) ABSTRACT

An image processing apparatus includes an AWB gain calculation section that calculates a WB gain Gs and a hysteresis gain Gh for every frame, a WB correction section that performs WB correction using Gh, a control section that causes the WB correction section to perform the WB correction using a fixed gain Gf during lock of white balance, and a gain adjustment section that weights and adds a WB gain Gs(n) and a correction hysteresis gain Gh'(n−1) to calculate a correction hysteresis gain Gh'(n) after unlock of the white balance, and the control section causes the WB correction section to perform WB correction for a frame n using Gh'(n).

15 Claims, 9 Drawing Sheets

(56) References Cited

U.S. PATENT DOCUMENTS

2013/0113956 A1* 5/2013 Anderson ............... G06F 3/017
  348/223.1
2016/0374176 A1* 12/2016 Van Der Poel .... H05B 33/0872

* cited by examiner

IMAGE PROCESSING APPARATUS, NON-TRANSITORY COMPUTER-READABLE MEDIUM STORING COMPUTER PROGRAM, AND IMAGE PROCESSING METHOD USING HYSTERESIS TO CALCULATE GAIN

CROSS REFERENCE TO RELATED APPLICATION

This application claims benefit of Japanese Application No. 2015-250035 filed in Japan on Dec. 22, 2015, the entire contents of which are incorporated herein by this reference.

BACKGROUND OF THE INVENTION

1. Field of the Invention

The present invention relates to an image processing apparatus, a non-transitory computer-readable medium storing a computer program, and an image processing method, for performing white balance correction of a moving image.

2. Description of the Related Art

Conventionally, auto white balance (AWB) processing for automatically correcting a white balance (WB) of a moving image has been performed. If an optimal WB gain is calculated in a unit of a frame and AWB processing is performed using the calculated WB gain, the color and brightness of an image change for each frame, and such change of the color and brightness is perceived as flickering, which makes the image difficult to see. In order to address such a problem, in the AWB processing, WB correction is performed using a hysteresis gain (WB gain having a value whose up-and-down fluctuation for each frame is suppressed) calculated based on WB gains of a plurality of frames.

Japanese Patent Application Laid-Open Publication No. 2003-348601, for example, discloses an auto white balance control method and an electronic camera in which after AWB processing is performed at the start of moving image photographing in a moving image photographing mode, a WB gain is fixed without executing periodic AWB processing during the moving image photographing, and an AE evaluation value is monitored and when the AE evaluation value fluctuates by a prescribed value or more, fixing of the WB gain is automatically released and the AWB processing is executed again. Such a technique is capable of reducing the processing load of a control section, which enables the cost of electronic cameras and the like to be reduced.

Although the technique disclosed in Japanese Patent Application Laid-Open Publication No. 2003-348601 is not intended to reduce flickering, the technique is expected to exhibit an effect of suppressing the flickering to be generated due to the fluctuation of the WB gain value for each frame. Furthermore, the technique is capable of setting a white balance suitable for each scene by automatically releasing the fixing of the WB gain depending on a change of a scene.

SUMMARY OF THE INVENTION

An image processing apparatus according to an aspect of the present invention includes: an auto white balance gain calculation section that performs, for every frame, calculation of a white balance gain Gs of one frame constituting a moving image and calculation of a hysteresis gain Gh based on white balance gains Gs of a plurality of time-series frames; a white balance correction section that performs white balance correction using the hysteresis gain Gh; a control section that causes the white balance correction section to perform white balance correction using a fixed gain Gf, the fixed gain Gf being the hysteresis gain Gh at a time of a lock instruction, during a lock period after the lock instruction until an unlock instruction is performed; and a gain adjustment section that calculates a correction hysteresis gain Gh' by correcting the hysteresis gain Gh after the unlock instruction is performed, the gain adjustment section calculating, when a frame number is represented by an integer n according to time series, a correction hysteresis gain Gh'(n) for a frame n using a weight $\alpha$ of 0 or more and 1 or less, a value of the weight $\alpha$ becoming larger as a change rate D between a correction hysteresis gain Gh'(n−1) of a frame (n−1) and a white balance gain Gs(n) of the frame n becomes larger, wherein the control section controls the white balance correction section to cause the white balance correction section to perform white balance correction for the frame n using the correction hysteresis gain Gh'(n) instead of a hysteresis gain Gh(n) of the frame n.

A non-transitory computer-readable medium storing a computer program according to an aspect of the present invention is a non-transitory computer-readable medium storing a computer program for causing a computer to execute: an auto white balance gain calculation step of performing, for every frame, calculation of a white balance gain Gs of one frame constituting a moving image and calculation of a hysteresis gain Gh based on white balance gains Gs of a plurality of time-series frames; a white balance correction step of performing white balance correction using the hysteresis gain Gh; a control step of causing the white balance correction to be performed in the white balance correction step using a fixed gain Gf, the fixed gain Gf being the hysteresis gain Gh at a time of a lock instruction, during a lock period after the lock instruction until an unlock instruction is performed; and a gain adjustment step of calculating a correction hysteresis gain Gh' by correcting the hysteresis gain Gh after the unlock instruction is performed, wherein when a frame number is represented by an integer n according to time series, a correction hysteresis gain Gh'(n) for a frame n is calculated using a weight $\alpha$ of 0 or more and 1 or less, a value of the weight $\alpha$ becoming larger as a change rate D between a correction hysteresis gain Gh'(n−1) of a frame (n−1) and a white balance gain Gs(n) of the frame n becomes larger, wherein the control step is a step of controlling the white balance correction step such that white balance correction for the frame n is performed using the correction hysteresis gain Gh'(n) instead of a hysteresis gain Gh(n) of the frame n.

An image processing method according to an aspect of the present invention includes: an auto white balance gain calculation step of performing, for every frame, calculation of a white balance gain Gs of one frame constituting a moving image and calculation of a hysteresis gain Gh based on white balance gains Gs of a plurality of time-series frames; a white balance correction step of performing white balance correction using the hysteresis gain Gh; a control step of causing the white balance correction to be performed in the white balance correction step using a fixed gain Gf, the fixed gain Gf being the hysteresis gain Gh at a time of a lock instruction, during a lock period after the lock instruction until an unlock instruction is performed; and a gain adjustment step of calculating a correction hysteresis gain Gh' by correcting the hysteresis gain Gh after the unlock instruction is performed, wherein when a frame number is represented by an integer n according to time series, a correction hysteresis gain Gh'(n) for a frame n is calculated using a weight $\alpha$ of 0 or more and 1 or less, a value of the weight α becoming larger as a change rate D between a correction hysteresis gain Gh'(n-1) of a frame (n-1) and a white balance gain Gs(n) of the frame n becomes larger, wherein the control step is a step of controlling the white balance correction step such that white balance correction for the frame n is performed using the correction hysteresis gain Gh'(n) instead of a hysteresis gain Gh(n) of the frame n.

DETAILED DESCRIPTION OF THE PREFERRED EMBODIMENT(S)

Hereinafter, an embodiment of the present invention will be described with reference to drawings.

[First Embodiment]

Figure 1:
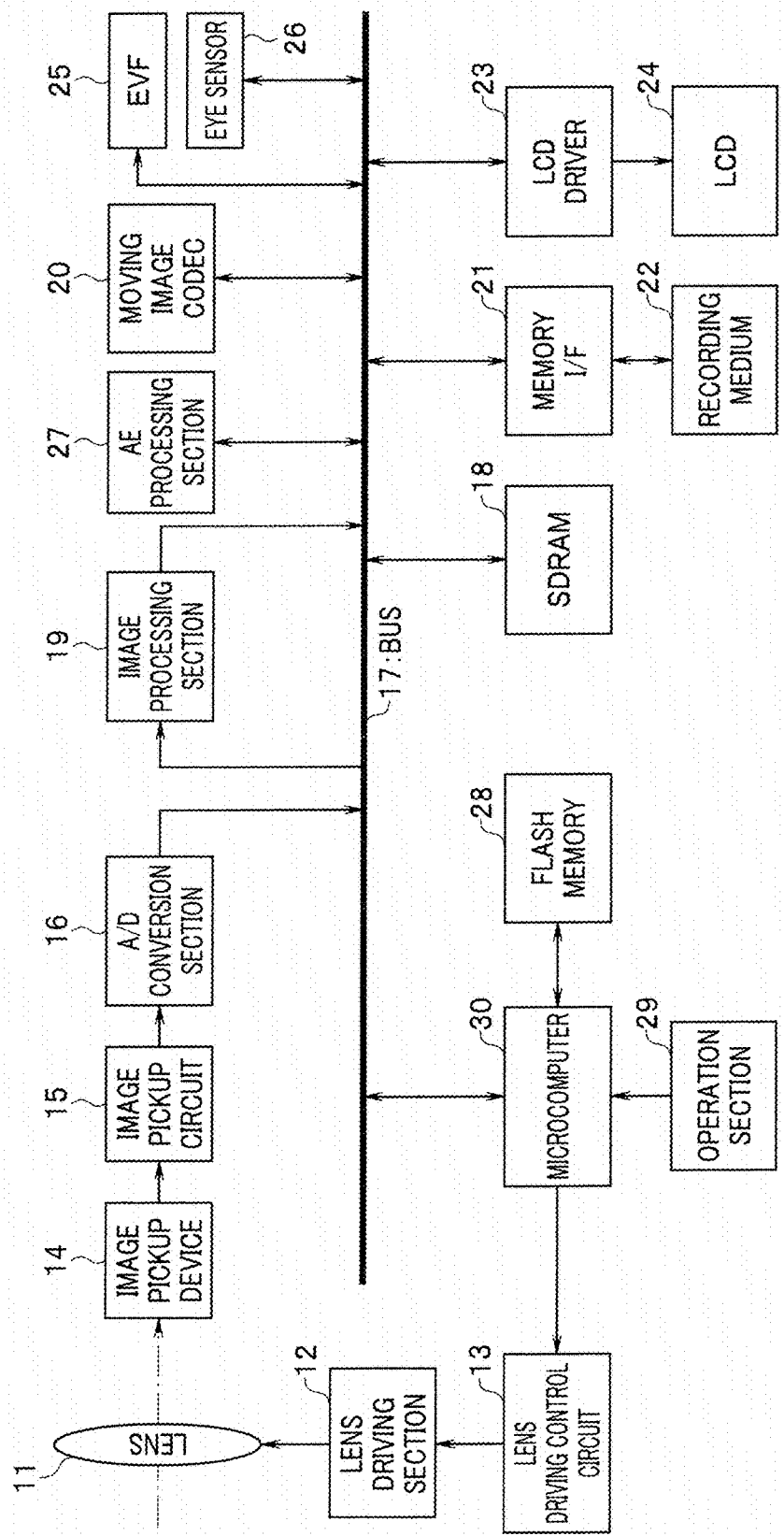
FIG. 1 is a block diagram showing a configuration of an image pickup apparatus to which an image processing apparatus according to a first embodiment of the present invention is applied.

FIGS. 1 to 14 show the first embodiment of the present invention, and FIG. 1 is a block diagram showing a configuration of an image pickup apparatus to which an image processing apparatus is applied.

As shown in FIG. 1, the image pickup apparatus includes a lens 11, a lens driving section 12, a lens driving control circuit 13, an image pickup device 14, an image pickup circuit 15, an analog/digital conversion section (A/D conversion section) 16, a bus 17, an SDRAM 18, an image processing section 19, a moving image codec 20, a memory interface (memory I/F) 21, a recording medium 22, an LCD driver 23, an LCD 24, an electronic view finder (EVF) 25, an eye sensor 26, an AE processing section 27, a flash memory 28, an operation section 29, and a microcomputer 30.

The lens 11 is an image pickup optical system that forms an optical image of an object in an image pickup region of the image pickup device 14. The lens 11 includes a focus lens that adjusts the focus position (focal position) to perform focusing and an optical diaphragm for controlling the range of a luminous flux passing through the lens, for example.

The lens driving section 12 includes a driving source such as an actuator, and configured to cause the focus lens to move in the optical axis direction of the lens 11 and to cause the aperture diameter of the optical diaphragm to change.

Based on a command from the microcomputer 30, the lens driving control circuit 13 adjusts the focus position by driving the focus lens through the lens driving section 12, and adjusts a diaphragm value by driving the optical diaphragm.

The image pickup device 14 is an image pickup section that photoelectrically converts and picks up the optical image of the object formed by the lens 11 to generate an analog image signal, and outputs the generated analog image signal, and the image pickup device 14 is configured as a color image pickup device including a color filter of primary color Bayer array, for example.

The image pickup circuit 15 subjects the analog image signal read out from the image pickup device 14 to reduction process of reset noise and the like, then to waveform shaping process, and further to gain increase process to obtain a target brightness.

The A/D conversion section 16 converts the analog image signal outputted from the image pickup circuit 15 into a digital image signal (referred to as image data, as needed).

The bus 17 is a transfer path for transferring various kinds of data and control signals generated at a certain part in the image pickup apparatus to another part in the image pickup apparatus. The bus 17 according to the present embodiment is connected to the A/D conversion section 16, the SDRAM 18, the image processing section 19, the moving image codec 20, the memory I/F 21, the LCD driver 23, the EVF 25, the eye sensor 26, the AE processing section 27, and the microcomputer 30.

The image data outputted from the A/D conversion section 16 is transferred through the bus 17 to be temporarily stored in the SDRAM 18.

The SDRAM 18 is a storing section that temporarily stores various kinds of data such as the image data outputted from the A/D conversion section 16, the image data processed or being processed by the image processing section 19, the image data processed or being processed by the moving image codec 20, and the like.

The image processing section 19 performs various kinds of image processing on the image data, to create an image for displaying or recording. For example, the image processing section 19 performs image processing such as demosaicing processing, color reproduction processing, and noise reduction processing. Furthermore, the image processing section 19 includes a function as a white balance adjusting section that adjusts white balance of an image. The configuration and working related to the white balance adjusting function will be described later with reference to FIGS. 2, 3, etc.

The moving image codec 20 compresses and expands the moving image data with an appropriate processing method such as Motion JPEG or MPEG. Note that the moving image codec 20 may also function as a compression/expansion section for a still image, or a JPEG processing section and the like may be provided in addition to the moving image codec 20. After a header and the like are added to the moving image data processed by the moving image codec 20 by the microcomputer 30, the resulting moving image data is recorded as a moving image file in the recording medium 22 through the memory I/F 21.

The memory I/F 21 is a recording control section that performs control of recording the image data in the recording medium 22, and is configured to also read out the image data from the recording medium 22.

The recording medium 22 is a recording section that stores, in a non-volatile manner, the image data (moving image data, still image data, etc.) processed for recording by the image processing section 19, and is configured by a memory card attachable to and detachable from the image pickup apparatus, for example. Therefore, the recording medium 22 does not necessarily have a configuration unique to the image pickup apparatus.

The LCD driver 23 reads out the image data stored in the SDRAM 18 to convert the read-out image data into a video signal, and drives and controls the LCD 24 to cause the LCD 24 to display the image based on the video signal.

The LCD 24 is a display section that displays an image and various kinds of information related to the image pickup apparatus by being driven and controlled by the LCD driver 23, as described above.

The EVF 25 is for observing an image in a magnified manner through an eyepiece and the like, and is a display section that displays the image related to the image data and various kinds of information related to the image pickup apparatus.

The various kinds of information related to the image pickup apparatus displayed on the LCD 24 or the EVF 25 include an indication for indicating that the white balance is locked, being adjusted, or already adjusted.

The eye sensor 26 is disposed in the vicinity of the EVF 25, and is a sensor for detecting existence or non-existence of a proximate object. When a user performs eyepiece observation of the EVF 25, for example, the eye sensor 26 detects the existence of the proximate object (user's eyes). Furthermore, as described later, when the moving image photographing mode is set, the eye sensor 26 is also used as the operation section through which the user performs an operation for locking or unlocking the white balance.

The AE processing section 27 measures the object luminance based on the image data outputted from the A/D conversion section 16, to calculate a BV value in the APEX system, for example. The calculated BV value is used for automatic exposure (AE) control by the microcomputer 30, that is, the control of the optical diaphragm of the lens 11, the control of the exposure time by an optical shutter or an electronic shutter, the control of luminance gain based on the set ISO sensitivity, and the like.

The flash memory 28 is a storage medium that stores, in a non-volatile manner, a processing program (including an image processing program which is a program for executing the image processing method by the image processing apparatus) to be executed by the microcomputer 30 and various kinds of information related to the image pickup apparatus. As several examples of the information stored in the flash memory 28, a model name and production number for identifying the image pickup apparatus, parameters, tables, and functions, which are to be used for the image processing, or setting values set by the user, etc., can be listed, for example. The information stored in the flash memory 28 is read by the microcomputer 30.

The operation section 29 is a section through which various kinds of operation inputs to the image pickup apparatus are performed and includes a power source button for turning on and off the power source of the image pickup apparatus, a release button used for performing an image photographing instruction, a reproduction button for reproducing the recorded image, a menu button for performing setting and the like of the image pickup apparatus, operation buttons such as a cross key to be used for item selecting operation and an OK button to be used for determination operation of the selected item, and the like.

The release button is used for performing a still image photographing instruction, and also used for performing an instruction for starting or terminating the moving image recording, and configured as a two-stage operation button including, for example, a first release switch and a second release switch.

The items that can be set by using the menu button, the cross key, the OK button and the like include a photographing mode (still image photographing mode, moving image photographing mode, etc.), a recording mode (number of recording pixels, compression format, compression rate, etc.), a reproducing mode, and the like. When an operation is performed with respect to the operation section 29, a signal corresponding to the operation content is outputted to the microcomputer 30.

The microcomputer 30 is a control section that integrally controls the image pickup apparatus. When receiving an operation input by the user from the operation section 29 or a detection result from the eye sensor 26, the microcomputer 30 reads from the flash memory 28 the parameters and the like necessary for the processing, according to the processing program stored in the flash memory 28, and executes various kinds of sequences corresponding to the operation contents.

For example, when the still image photographing mode is set, the microcomputer 30 determines whether or not an eyepiece observation is performed based on whether or not the eye sensor 26 detects existence of a proximate object. In addition, when the moving image photographing mode is set, the microcomputer 30 determines that the lock instruction or the unlock instruction has been inputted by the user, based on the detection result by the eye sensor 26. In the present embodiment, the lock instruction is an instruction for fixing the gain for white balance, and the unlock instruction is an instruction for releasing the fixing of the gain for white balance.

Specifically, in the moving image photographing mode, it is detected that the lock instruction has been inputted when existence of a proximate object has been detected first, and it is detected that the unlock instruction has been inputted when the existence of the proximate object has been detected second time, by the user bringing an object such as his or her hand close to the eye sensor 26.

However, the method of inputting the instructions by using the eye sensor 26 is not limited to the above-described method. For example, when it is detected that the existence and non-existence of the proximate object has been continuously switched by the user waving his or her palm in the vicinity of the eye sensor 26, it may be detected that the lock instruction or the unlock instruction has been inputted. Such a configuration is capable of surely avoiding the malfunction that is likely to occur when an unintended object approaches the eye sensor 26.

The lock instruction or the unlock instruction can be inputted by the user not only with the eye sensor 26 but also with the button, switch, touch panel, or the like provided on the operation section 29. However, an image blur sometimes occurs when the button or the like is operated at the time of moving image photographing. Therefore, it is preferable to avoid such an image blur by using the eye sensor 26 that is capable of performing the lock instruction and the unlock instruction in non-contact manner.

Note that in the case where a remote controller is attached to the image pickup apparatus, the lock instruction and the unlock instruction may be inputted through the remote controller. Alternatively, the lock instruction and the unlock instruction may be inputted through a smart phone by installing an application for remotely operating the image pickup apparatus in the smart phone.

Figure 2:
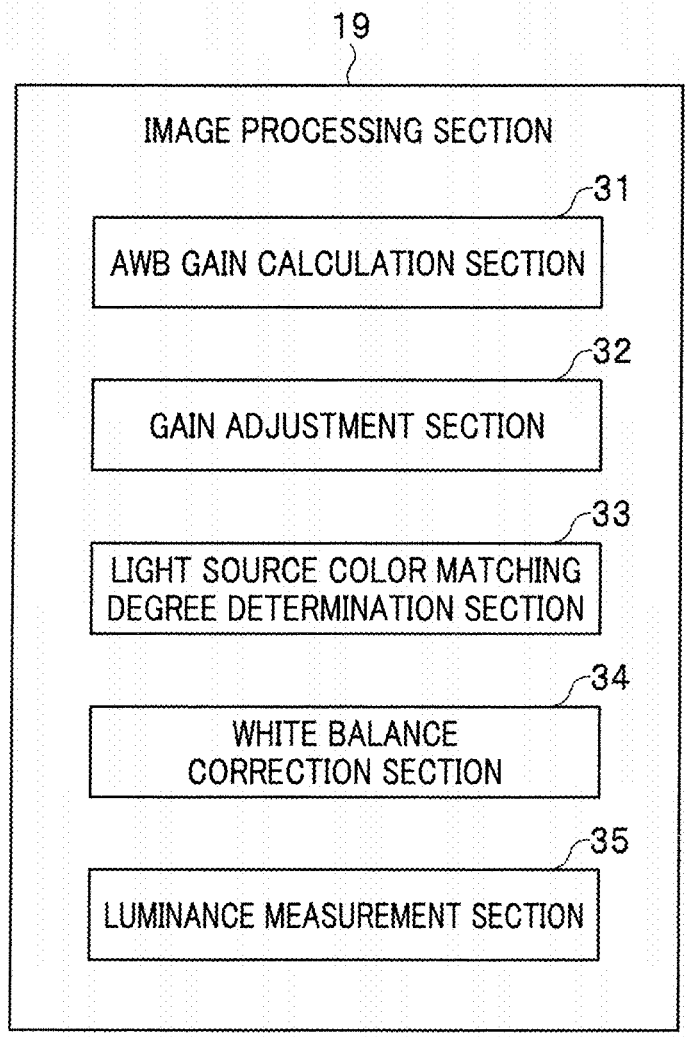
FIG. 2 is a block diagram showing a configuration related to a white balance adjusting function of an image processing section according to the first embodiment.

Next, FIG. 2 is a block diagram showing the configuration related to a white balance adjusting function of the image processing section 19.

The image processing section 19 includes an auto white balance (AWB) gain calculation section 31, a gain adjustment section 32, a light source color matching degree determination section 33, a white balance correction section 34, and a luminance measurement section 35, as the configuration related to the white balance adjusting function.

Though the white balance adjusting function of the image processing section 19 is used for both of a still image and a moving image, description will be made below by taking the case where the white balance adjusting function is mainly used for a moving image as an example.

The AWB gain calculation section 31 performs, for every frame, calculation of a white balance (WB) gain Gs of one frame constituting a moving image and calculation of a hysteresis gain Gh based on the WB gains Gs of a plurality of time-series frames.

That is, the AWB gain calculation section 31 calculates a gain Gr to be applied to an R component of the R, G, and B components that configure a color image and a gain Gb to be applied to a B component of the R, G, and B components. The reason why the gains are calculated only for the R component and the B component is to prevent G component, which is a component corresponding to the luminance, from changing (therefore, the gain Gg for the G component can be said that Gg=1), since it is sufficient to adjust the brightness of the image with another luminance adjustment circuit or the like. Hereinafter, the gains are just referred to as gain G, for example, as a representative of the gains Gr and Gb.

When calculating the gain G, the AWB gain calculation section 31 first calculates the WB gain Gs suitable for displaying a white object in the image of the one frame as white in color, based on the image data of one frame in the moving image data obtained in the unit of a frame. That is, when the frame number of the frame that constitutes the moving image data is represented with an integer n according to the time series, the AWB gain calculation section 31 calculates, for every frame, the WB gain Gs(n) for the n-th frame n.

Next, the AWB gain calculation section 31 calculates the hysteresis gain Gh(n) to be applied to the image data of the current frame n, based on the WB gain Gs(n) of the current frame n, and the WB gains Gs(n−1), Gs(n−2), . . . , of the one or more past frames n−1, n−2, . . . , for example.

As one example, the AWB gain calculation section 31 calculates the hysteresis gain Gh(n) of the current frame n, based on the WB gain Gs(n) of the current frame n and the hysteresis gain Gh(n−1) of the previous frame (n−1) (since the hysteresis gain Gh(n−1) is calculated using the WB gain Gs(n−1) of the previous frame (n−1), with the calculation method, the hysteresis gain Gh(n) of the current frame n is calculated based on the WB gains Gs of the current frame and one or more past frames). The calculation method of the hysteresis gain Gh is not limited to this example, and may be calculated with a publicly known appropriate calculation method. It is preferable to employ a method of following the change of the white balance in a photographing scene while suppressing the up-and-down fluctuation of the gain value for every frame.

The AWB gain calculation section 31 performs such calculation of the hysteresis gain Gh(n) for every frame also while the white balance is locked (the period during which the white balance is locked is referred to as a lock period, as needed).

The gain adjustment section 32 corrects the hysteresis gain Gh to be applied to the image to calculate a correction hysteresis gain Gh' after the unlock instruction is performed and the lock period of the white balance is terminated.

The gain adjustment section 32 adjusts the gain value during a period after the unlock instruction has been performed until the light source color matching degree determination section 33 determines that the white balance is already adjusted (hereinafter, referred to as adjusting period, as needed). That is, other than the adjusting period, the microcomputer 30 performs control of stopping the operation of the gain adjustment section 32. Such a control inhibits operation of the gain adjustment section 32, to thereby allow the processing load and power consumption to be reduced.

Figure 4:
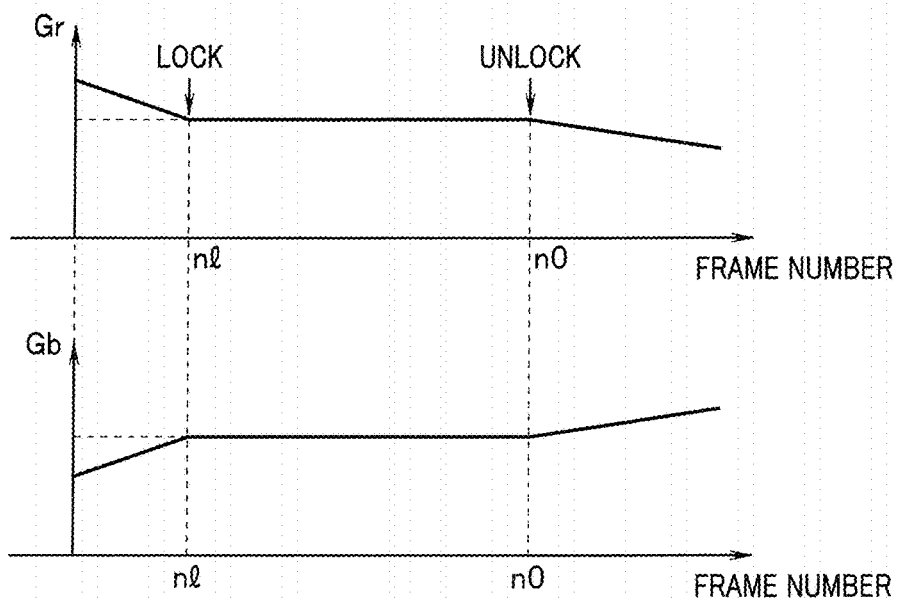
FIG. 4 is a timing chart showing an example of a state of gain change during a lock period of a gain for white balance, and before and after the lock period in the first embodiment.

FIG. 4 is a timing chart showing an example of the state of the gain change during the lock period of the gain for white balance, and before and after the lock period. Note that the horizontal axis in FIG. 4 shows the lapse of time with the frame numbers.

The gains Gr, Gb change in accordance with the photographing scene until the frame n1 in which the lock instruction is performed by the microcomputer 30. Then, during the lock period from the frame n1 in which the lock instruction is performed until the frame n0 in which the unlock instruction is performed, the microcomputer 30 performs control of causing the white balance correction section 34 to correct the white balance using a fixed gain Gf, by setting the hysteresis gain at the time when the lock instruction is performed as the fixed gain Gf shown in FIG. 5. Therefore, the gains Gr, Gb of the frame n1 in which the lock instruction is performed are maintained until the frame n0 in which the unlock instruction is performed. In the frame after the frame n0, the gains Gr, Gb change again in accordance with the photographing scene.

Figure 5:
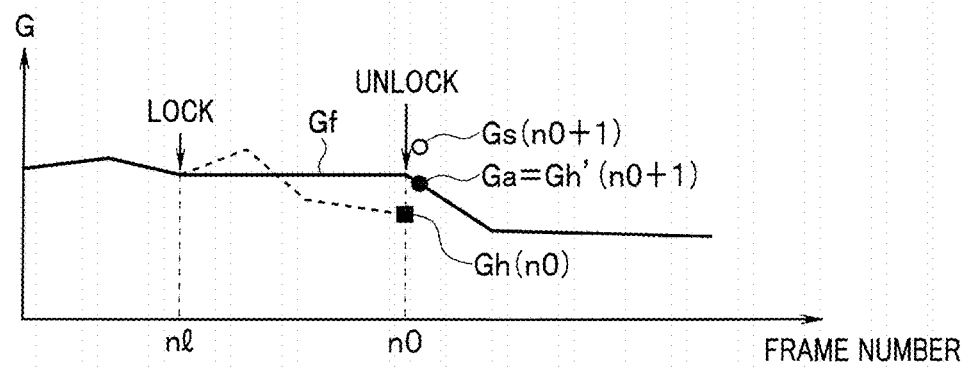
FIG. 5 is a diagram showing a state where an application gain for a frame immediately after unlock is calculated in the first embodiment.

As shown by the dotted line in FIG. 5, the AWB gain calculation section 31 calculates the hysteresis gain Gh(n) also during the lock period from the frame n1 to the frame n0. The hysteresis gain Gh(n0) of the frame n0 in which the unlock instruction is performed has a gain value different from the value of the fixed gain Gf which was being applied during the lock period, by a predetermined value (for example, a predetermined value with which a change of the color is recognized) or more in some cases. Therefore, if the hysteresis gain Gh is applied immediately after the unlock instruction has been performed, the white balance changes largely, and such a change is recognized as flickering.

In order to reduce the flickering, the gain adjustment section 32 adjusts the gain value of the hysteresis gain Gh, and with such adjustment, the correction hysteresis gain Gh' is calculated. Detailed description will be made later on how the gain adjustment section 32 calculates the correction hysteresis gain Gh'.

The light source color matching degree determination section 33 determines, for every frame, whether or not the white balance is already adjusted (the white balance matches the light source color). The light source color matching degree determination section 33 is capable of determining that the white balance matches the light source color when the temporal change of the gain for white balance applied to the frame image becomes small to be close to a certain value, for example. However, another appropriate method may be adopted to determine whether or not the white balance matches the light source color.

The white balance correction section 34 performs the white balance adjustment using the hysteresis gain Gh calculated by the AWB gain calculation section 31 during the period other than the lock period and the above-described adjusting period, based on the control by the microcomputer 30. In addition, the white balance correction section 34 performs the white balance adjustment using the fixed gain Gf during the lock period, based on the control by the microcomputer 30. Furthermore, the white balance correction section 34 performs the white balance adjustment using the correction hysteresis gain Gh' adjusted by the gain adjustment section 32 during the above-described adjusting period, based on the control by the microcomputer 30.

The luminance measurement section 35 measures the object luminance of the frame image. The measured object luminance is used for correcting the weight α to be used when calculating the correction hysteresis gain Gh', which will be described later with reference to FIGS. 8 to 10, etc.

Note that, when the image processing apparatus is applied to the image pickup apparatus, for example, the AE processing section 27 for measuring the object luminance is provided, as described above. Therefore, the luminance measurement section 35 may be omitted, and the object luminance measured by the AE processing section 27 may be used (in this case, the AE processing section 27 also serves as the luminance measurement section).

Figure 3:
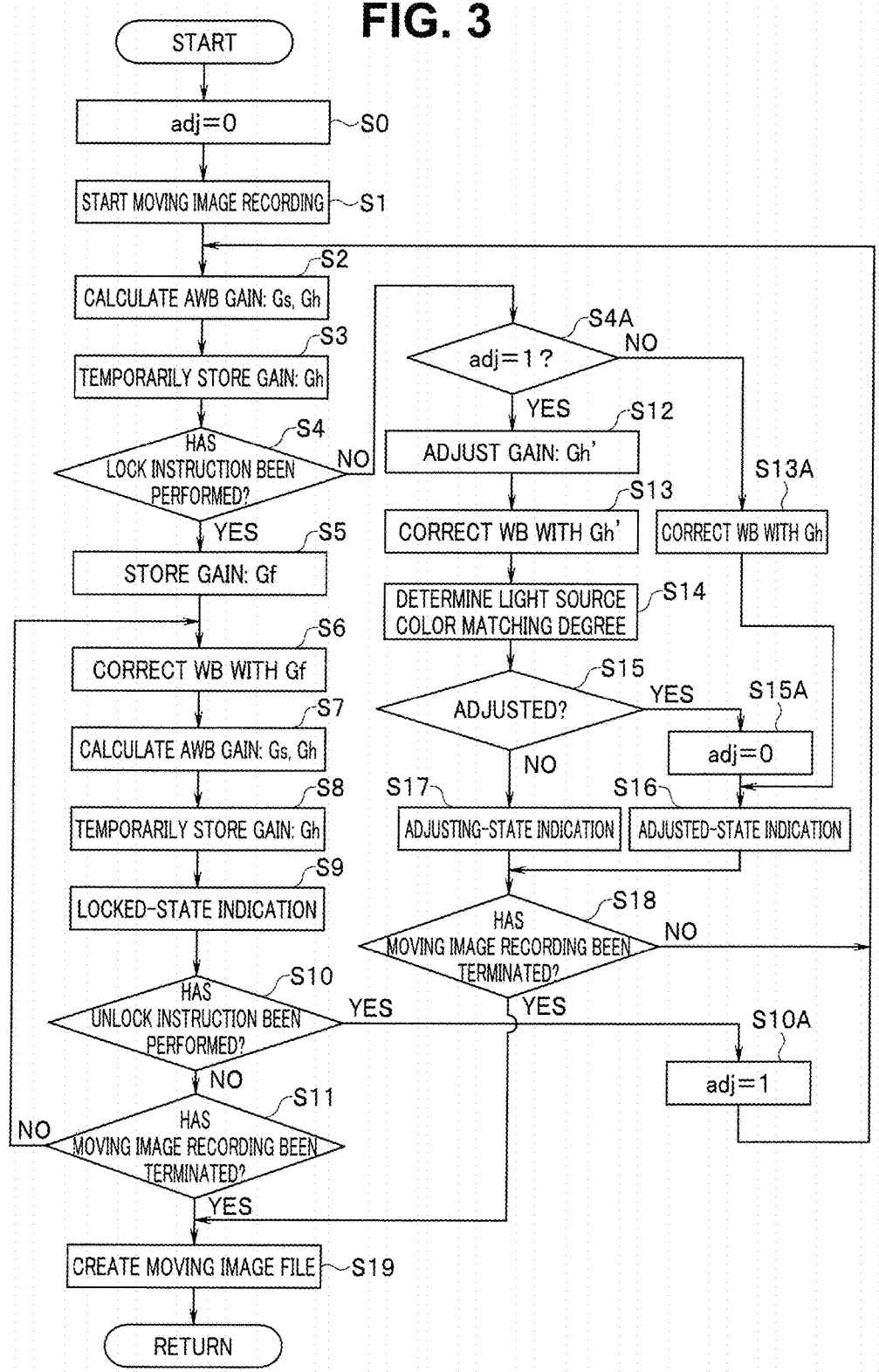
FIG. 3 is a flowchart showing a working of the image pickup apparatus to which the image processing apparatus according to the first embodiment is applied.

Next, FIG. 3 is a flowchart showing the working of the image pickup apparatus to which the image processing apparatus is applied. The processing shown in FIG. 3 is performed mainly as the operation of the sections including the image processing section 19 in the image pickup apparatus under the control by the microcomputer 30 that executes the processing program stored in the flash memory 28.

In the main processing, not shown, when the image pickup apparatus is set in the moving image photographing mode and live-view display is on the LCD 24, etc., if the start of moving image recording is instructed by a release button being pressed, for example, the processing is started and a flag adj to be used during the processing is initialized to 0 (step S0). Note that, in FIG. 3, the equal sign "=" is used in the same way as that in the programming. That is, "adj=" indicates that the value on the right side of the "=" is assigned to the flag adj, except for the case where the sign "?" is attached.

The flag adj indicates whether or not the present period is the adjusting period during which the gain value is being adjusted by the above-described gain adjustment section 32. When the flag adj is 0, the flag indicates that the present period is not the adjusting period, and when the flag adj is 1, the flag indicates that the present period is the adjusting period.

In addition, at the time of the initialization, the operation of the gain adjustment section 32 is stopped by the control by the microcomputer 30.

Then, the moving image recording is started (step S1).

As described above, every time the frame image constituting the moving image is obtained, the AWB gain calculation section 31 calculates the WB gain Gs related only to the obtained frame and the hysteresis gain Gh related to the obtained frame and the past frame (step S2).

The calculated hysteresis gain Gh is temporarily stored in the SDRAM 18, for example, (or may be stored in a memory section, not shown, in the image processing section 19 or the microcomputer 30, the same applies hereafter) based on the control by the microcomputer 30 (step S3).

Then, based on the instruction inputted by the user through the eye sensor 26 that functions as the operation section (or the operation section 29, the same applies hereafter), the microcomputer 30 determines whether or not the lock instruction for locking the white balance has been performed (step S4).

When it is determined that the lock instruction is not performed, determination is made on whether or not the flag adj is 1 (step S4A).

Immediately after the processing shown in FIG. 3 is started, for example, since the flag is set such that adj=0 in the above-described step S0, it is determined that the flag adj is not 1.

In this case, the white balance correction section 34 performs white balance correction for the frame n using the hysteresis gain Gh(n) (step S13A).

Figure 13:
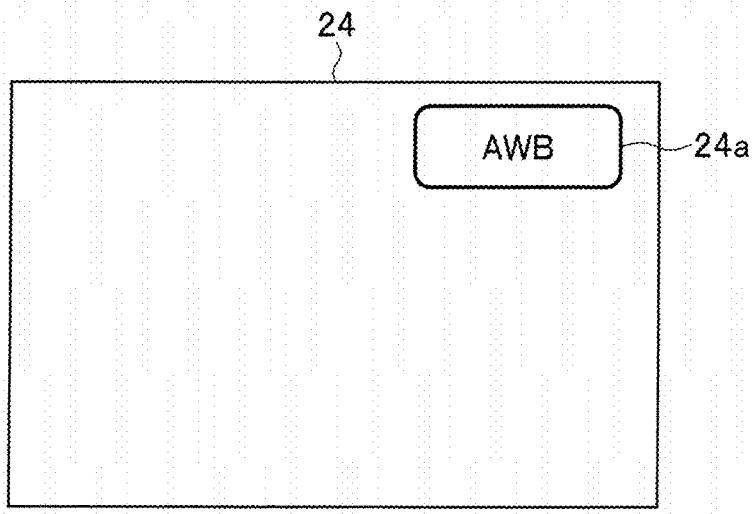
FIG. 13 is a view showing an example of an adjusted-state indication which indicates that the white balance is already adjusted in the first embodiment.

Then, an adjusted-state indication 24a as shown in FIG. 13 is superimposed on the frame image subjected to the white balance adjustment in the step S13A, to be displayed on the LCD 24 as the display section, for example (step S16).

FIG. 13 is a view showing an example of an adjusted-state indication 24a which indicates that the white balance is already adjusted. In the example of the indication shown in FIG. 13, the characters "AWB", which indicate that auto white balance execution mode is set, are displayed. However, the characters "-L", which indicate that the white balance is locked as shown in a locked-state indication 24l in FIG. 12 to be described later, are not added. Furthermore, the color of the characters and the background color of the character part are normal colors, unlike the inverted colors as shown in the locked-state indication 24l in FIG. 12.

After that, it is determined whether or not termination of the moving image recording has been instructed, based on whether or not the release button has been pressed again, for example (step S18).

When it is determined that termination of the moving image recording is not instructed, the processing procedure returns to step S2 and above-described processing is performed.

When the lock instruction is performed through the operation section such as the eye sensor 26, for example, while the loop processing of steps S2, S3, S4, S4A, S13A, S16, and S18 (the processing in the normal period which is neither the lock period nor the adjusting period) is performed, it is determined that the lock instruction has been performed in the above-described step S4.

In this case, if the gain adjustment section 32 is being operated, the processing in the lock period is started after the control of stopping the operation of the gain adjustment section 32 is performed by the microcomputer 30, and the latest hysteresis gain Gh of the gains obtained at the time when the lock instruction was performed is saved in the SDRAM 18, for example, as the fixed gain Gf (step S5).

Then, based on the control by the microcomputer 30, the white balance correction section 34 performs the white balance adjustment on the obtained frame image by using the fixed gain Gf (step S6).

On the other hand, as described above, even while the white balance is locked, the AWB gain calculation section 31 calculates the WB gain Gs and the hysteresis gain Gh (step S7), and the calculated hysteresis gain Gh is temporarily stored in the SDRAM 18, for example (step S8).

Subsequently, the frame image subjected to the white balance adjustment in the step S6 is displayed on the LCD 24 as the display section, for example. On the image displayed on the LCD 24, the locked-state indication 24*l* which indicates that the auto white balance is locked is superimposed, as shown in FIG. 12, with a superimposing function of the image processing section 19 based on the control by the microcomputer 30, for example (step S9).

Figure 12:
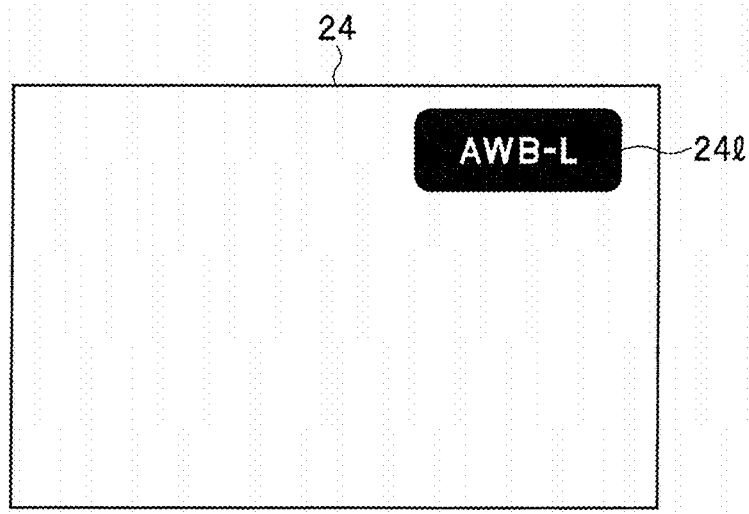
FIG. 12 is a view showing an example of locked-state indication showing that the white balance is locked in the first embodiment.

FIG. 12 is a view showing an example of the locked-state indication 24*l*, which indicates that the white balance is locked. In the example of the indication shown in FIG. 12, the characters "–L" which indicate the locked state are added after the characters "AWB" which indicate the auto white balance execution mode is set, and the color of the characters and the background color of the character part are inverted with respect to the adjusted-state indication 24*a* in FIG. 13 described above.

After that, it is determined whether or not the unlock instruction has been performed through the operation section such as the eye sensor 26 (step S10).

When it is determined that the unlock instruction is not performed, determination is made on whether or not the termination of the moving image recording has been performed based on whether or not the release button has been pressed again, for example (step S11).

When it is determined that the termination of the moving image recording is not performed, the processing procedure returns to the step S6 and the processing as described above is performed.

On the other hand, when it is determined that the unlock instruction has been performed in the step S10, the flag adj is set to 1 (step S10A).

After that, the processing procedure returns to step S2 and the WB gain Gs and the hysteresis gain Gh are calculated, the hysteresis gain Gh is stored in the step S3, and the determination in step S4 is made.

If it is immediately after the determination that the unlock instruction has been performed in the step S10, determination is made that the lock instruction is not performed in the step S4. In this case, the processing in the step S4A is further performed, and determination is made whether or not the flag adj is 1.

If it is immediately after the unlock instruction has been performed, since setting is performed such that adj=1 in the above-described step S10A, it is determined that the flag adj is 1 in the step S4A.

Then, the processing in the adjusting period is started, and the microcomputer 30 starts the operation of the gain adjustment section 32 and the gain adjustment section 32 calculates the correction hysteresis gain Gh' (step S12).

Description is made here on the calculation processing of the correction hysteresis gain Gh' for the frame (n0+1) immediately after the unlock instruction has been performed, with reference to FIG. 5. FIG. 5 is a diagram showing a state where the application gain for the frame immediately after the unlock is calculated.

The hysteresis gain Gh(n) calculated also during the lock period shifts at the value different from the fixed gain Gf that is applied during the lock period, as shown with the dotted lines in FIG. 5. Therefore, if the hysteresis gain Gh(n) is applied as-is after the unlock instruction, flickering is recognized in some cases, as described above.

Therefore, based on the hysteresis gain Gh(n0) of the frame n0 in which the unlock instruction has been performed, the WB gain Gs(n0+1) of the frame (n0+1) immediately after the unlock, and the fixed gain Gf that was being applied during the lock period, the gain adjustment section 32 calculates the correction hysteresis gain Gh'(n0+1) that is an application gain Ga to be applied to the frame (n0+1), as shown below.

When calculating the correction hysteresis gain Gh'(n0+1), the gain adjustment section 32 sets either the hysteresis gain Gh(n0) or the WB gain Gs(n0+1) as a selection gain Gc.

Figure 6:
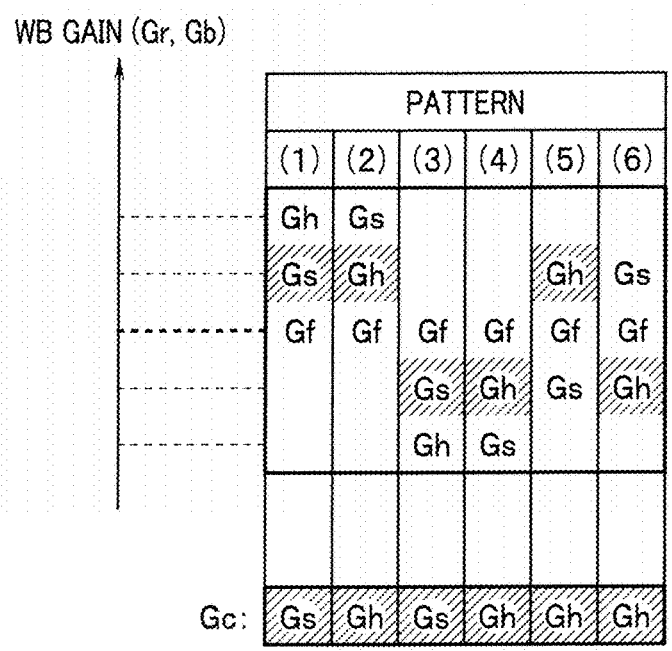
FIG. 6 is a view for describing a selecting method of a selection gain to be used when the application gain for the frame immediately after the unlock is calculated in the first embodiment.

FIG. 6 is a view for describing a selecting method of a selection gain Gc to be used when the application gain Ga for the frame immediately after the unlock is calculated. Note that illustration of the frame numbers are omitted in FIG. 6.

The gain adjustment section 32 arranges the fixed gain Gf, the hysteresis gain Gh(n0), and the WB gain Gs(n0+1) in the order of the gain values. Specifically, FIG. 6 shows patterns (1) to (6) that show in which order the hysteresis gain Gh(n0) and the WB gain Gs(n0+1) are arranged with the fixed gain Gf as a center.

The cases where the fixed gain Gf is not between the hysteresis gain Gh(n0) and the WB gain Gs(n0+1) are shown in the patterns (1) to (4). In such cases, one of the hysteresis gain Gh(n0) and the WB gain Gs(n0+1), the arrangement order of which is closer to the fixed gain Gf (the one to which hatching is added in FIG. 6), is selected as the selection gain Gc.

The cases where the fixed gain Gf is between the hysteresis gain Gh(n0) and the WB gain Gs(n0+1) are shown in the patterns (5) and (6). In such cases, the hysteresis gain Gh(n0) is selected as the selection gain Gc.

When the selection gain Gc is thus determined, the gain adjustment section 32 calculates the correction hysteresis gain Gh'(n0+1) with the weight α by using an expression 1 shown below.

$$Gh'(n0+1) = \alpha \times Gf + (1-\alpha) \times Gc \quad \text{[Expression 1]}$$

Figure 7:
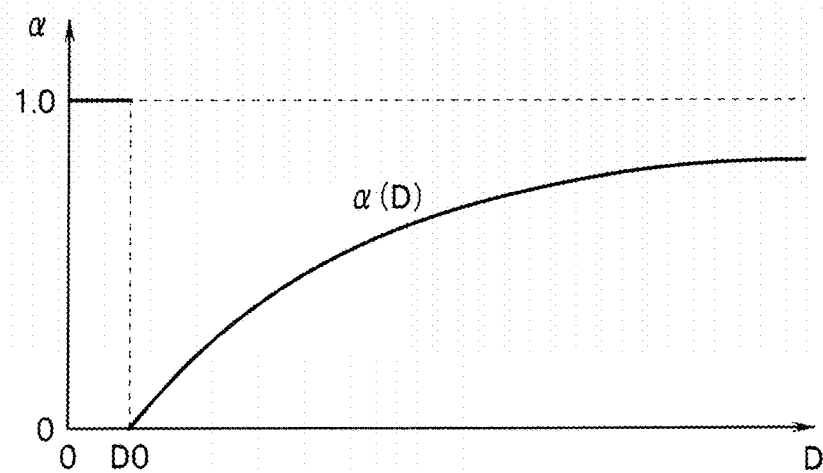
FIG. 7 is a diagram showing an example of a weight α to be used when a gain to be applied to an image is calculated in the first embodiment.

The gain adjustment section 32 is configured to set the weight α to a value of 0 or more and 1 or less as shown in FIG. 7, based on a change rate D between the fixed gain Gf and the selection gain Gc. FIG. 7 is a diagram showing an example of the weight α to be used when a gain to be applied to an image is calculated.

One example of the method of calculating the change rate D is an expression 2 shown below.

$$D = \text{abs}\{1 - (Gf/Gc)\} \quad \text{[Expression 2]}$$

In the expression, it is shown that the abs takes an absolute value. However, the calculation method of the change rate D is not limited to the method employing the expression 2, and an expression 3 shown below may be employed, for example. In the expression 2, the difference (Gc−Gf) between the selection gain Gc and the fixed gain Gf is divided by the selection gain Gc. In the expression 3, the difference (Gc−Gf) is divided by the fixed gain Gf.

$$D=\mathrm{abs}\{(Gc/Gf)-1\} \quad \text{[Expression 3]}$$

The calculation method is not limited to these expressions, and the absolute value of the difference (Gc−Gf) can be used, for example. In this case, the value to be obtained is not the change rate but a change amount, and the weight α has only to be set as a function of the change amount.

When the change rate D is smaller than a predetermined change rate D0 (0≤D<D0), the gain adjustment section 32 performs setting such that α=1, as shown in FIG. 7. In this case, the correction hysteresis gain Gh'(n0+1) is calculated such that Gh'(n0+1)=Gf, based on the expression 1, and the fixed gain Gf is applied even in the period immediately after the unlock. This is because, when the change rate D between the fixed gain Gf and the selection gain Gc is small, it is determined that there is no need for substantially changing the gain, to prevent the up-and-down fluctuation of the white balance in the unit of a frame.

Furthermore, the gain adjustment section 32 performs setting such that α=0, when the change rate D becomes the predetermined change rate D0, and thereafter performs setting such that the weight α becomes larger as the change rate D becomes larger than the predetermined change rate D0 (that is, the weight α monotonously increases).

That is, α=0 is set when D=D0 such that it is determined that the gain is required to be changed when the change rate D is equal to or larger than the predetermined change rate D0 and the gain returns to an appropriate gain in possible smallest number of frames. However, when the change rate D is large, α(D) is increased so as to bring the value of α(D) close to 1 or an upper limit value α0 to be described next, to prevent the gain change amount between frames from being too large so that the change amount is within an appropriate range.

The upper limit of the weight α which monotonously increases when D0≤D may be set to 1.0 as the upper limit value of α itself, or a predetermined upper limit value α0 smaller than 1.0(0<α0<1) may be set and the weight α may be brought close to the upper limit value α0.

Furthermore, the monotonous increase of the weight α when D0≤D forms a smooth curve shape in the example shown in FIG. 7 or the example shown in FIG. 9 to be described later. However, polygonal lines configured by connecting linear segments may be used, for example, in order to reduce the calculation load when the weight α is calculated according to the change rate D. As a specific example, a polygonal line may be used, which is formed such that the weight α linearly increases from the point at which (D, α)=(D0, 0) to the point at which (D, α)=(D1, α0) satisfying D0<D1, and α takes a constant value of α=α0 when D1≤D.

Note that the weight α changes according to the change rate D, as described above. However, in addition to such a configuration, the weight α may be set so as to change, with another factor as a parameter.

Description will be made on the example in which the weight α is changed according to the change amount of the object luminance in the lock period, with reference to FIGS. 8 to 10.

Figure 8:
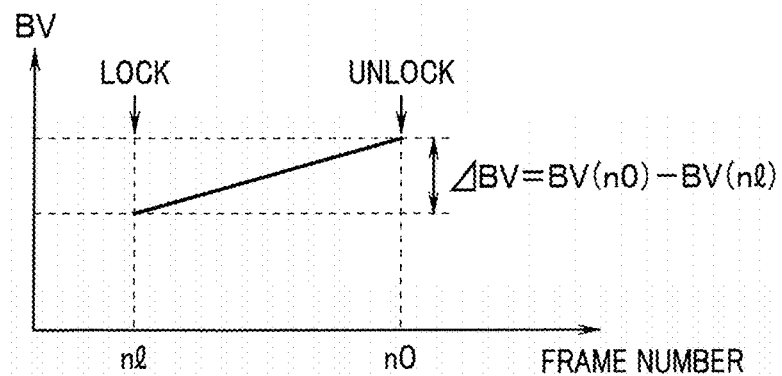
FIG. 8 is a diagram showing a state where a difference is generated between an object luminance at a time when a lock instruction is performed and an object luminance at a time when an unlock instruction is performed in the first embodiment.

FIG. 8 is a diagram showing a state where a difference is generated between the object luminance at the time when the lock instruction is performed and the object luminance at the time when the unlock instruction is performed.

The difference ΔBV, which indicates the change amount of the object luminance before and after the lock period, is calculated using an expression 4, shown below, where the object luminance measured by the luminance measurement section 35 (or the AE processing section 27, the same applies hereafter) for the image data of the frame n1 in which the lock instruction is performed is BV(n1) and the object luminance measured by the luminance measurement section 35 for the image data of the frame n0 in which the unlock instruction is performed is BV (n0).

$$\Delta BV=BV(n0)-BV(n1) \quad \text{[Expression 4]}$$

Figure 10:
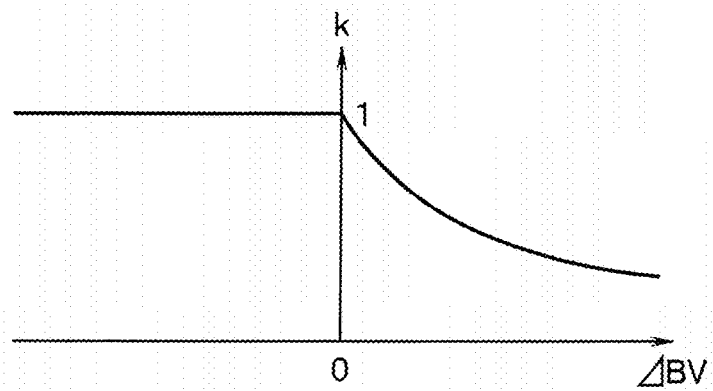
FIG. 10 is a diagram showing an example in which the coefficient k for changing the weight α is changed according to a difference between the object luminance at the time when the lock instruction is performed and the object luminance at the time when the unlock instruction is performed in the first embodiment.

The coefficient k depending on the difference ΔBV is calculated as shown in FIG. 10, for example. FIG. 10 is a diagram showing an example in which the coefficient k for changing the weight α is changed according to the difference ΔBV between the object luminance at the time when the lock instruction is performed and the object luminance at the time when the unlock instruction is performed.

In the example shown in FIG. 10, when the difference ΔBV is negative, with the coefficient k set as the function of the difference ΔBV, that is, the object luminance decreases before and after the lock period (ΔBV<0), the coefficient k takes a value of 1, and when the difference ΔBV is positive, the coefficient monotonously decreases from 1, as the difference ΔBV becomes larger. The coefficient k is maintained at 1 when ΔBV<0, and decreased only when 0<ΔBV. The reason is that human eyes have characteristics more sensitive to the change of color when the color of the object changes to a bright color than when the color of the object changes to a dark color.

The weight α(D) is changed by using the coefficient k thus set. FIG. 9 is a diagram showing a state where the weight α is changed with the coefficient k.

Figure 9:
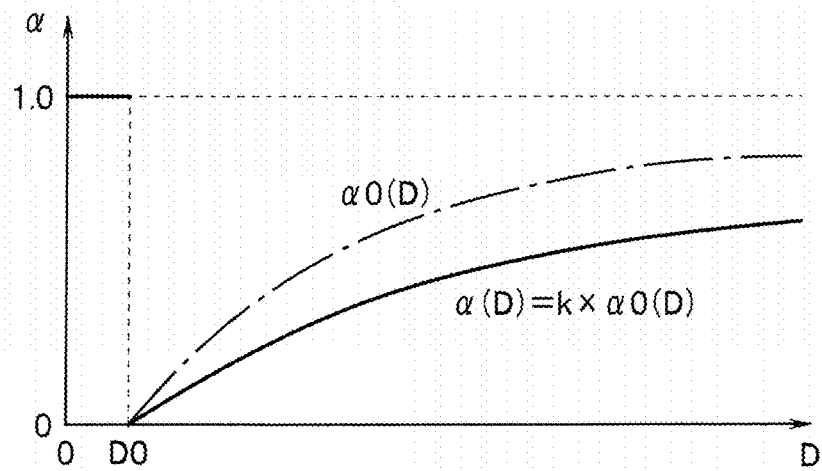
FIG. 9 is a diagram showing a state where the weight α is changed with a coefficient k in the first embodiment.

In the example shown in FIG. 9, a basic weight α0(D) is prepared in advance and stored in the flash memory 28, for example, and the gain adjustment section 32 calculates the coefficient k from the difference ΔBV, to calculate the weight α(D) by multiplying the basic weight α0(D) by k within the range of D0≤D, as shown in an expression 5, for example.

$$\alpha(D)=k\times\alpha 0(D) \quad \text{[Expression 5]}$$

The gain adjustment section 32 thus corrects the weight α within the range of 0 or more and 1 or less such that the greater the difference ΔBV, the smaller the value of the weight α with respect to the change rate D.

The gain adjustment section 32 causes the coefficient k with which the value of the weight α with respect to the change rate D is changed to automatically change according to the difference ΔBV between the luminance of the object before the lock period and the object luminance after the lock period. However, the present invention is not limited to such a configuration, and the coefficient k may be changed in accordance with the operation input from the user through the operation section, for example.

For example, when the unlock instruction is performed by depression operation of the unlock instruction button of the operation section 29, the coefficient k may be changed depending on how much longer the depression time ΔT of the unlock instruction button is than a predetermined shortest depression time ΔT0 (i.e., ΔT−ΔT0), that is, the coefficient k may be changed as the function k(ΔT−ΔT0) of the depression time extension amount (ΔT−ΔT0).

Alternatively, a pressure detection section may be provided to the unlock instruction button, and the coefficient k may be changed depending on how much greater a depression pressure P of the unlock instruction button is than a predetermined minimum depression pressure P0 (i.e., P−P0), that is, the coefficient k may be changed as the function k(P−P0) of the depression pressure increase amount (P−P0).

Note that the weight α(D) shown in FIG. 7, the basic weight α0(D) shown in FIG. 9, and the coefficient k shown in FIG. 10 may be stored in advance in the flash memory 28 as functions, or only specific points of the functions may be stored in a table or the like, for example, and a value of the point closest to a desired point may be used, or the value of the desired point may be calculated by interpolation calculation.

Figure 11:
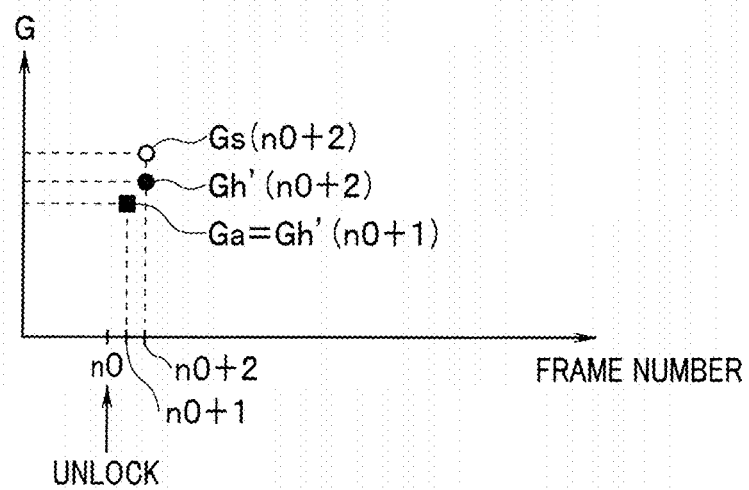
FIG. 11 is a diagram showing a state where a correction hysteresis gain to be applied to a frame next to the frame immediately after the unlock is calculated in the first embodiment.

Next, with reference to FIG. 11, description is made on the correction hysteresis gain Gh' calculated by the gain adjustment section 32 during a period which is in the frame (n0+2) next to the frame immediately after the unlock or the frames subsequent to the frame (n0+2) and which is the adjusting period until it is determined that white balance matches the light source color (white balance is already adjusted) in the step S14 (or further in the step S15).

FIG. 11 is a diagram showing a state where the correction hysteresis gain Gh'(n0+2) to be applied to the frame (n0+2) next to the frame immediately after the unlock is calculated.

When the frame numbers of the frames subsequent to the frame immediately after the unlock are supposed such that n=(n0+2), (n0+3), . . . , the gain adjustment section 32 calculates the correction hysteresis gain Gh'(n) for the frame n by using the weight α (see FIG. 7, for example) of 0 or more and 1 or less, as described above, based on an expression 6 shown below.

$$Gh'(n) = \alpha \times Gh'(n-1) + (1-\alpha) \times Gs(n) \qquad \text{[Expression 6]}$$

Note that FIG. 11 shows the state where n=(n0+2).

However, in this case, the change rate D with which the value of the weight α is changed is the change rate between the correction hysteresis gain Gh'(n−1) of the frame (n−1) which is one frame before the current frame n and the WB gain Gs(n) of the current frame n, and calculated based on an expression 7 shown below, for example.

$$D = \text{abs}[1 - \{Gh'(n-1)\}] \qquad \text{[Expression 7]}$$

Alternatively, instead of the expression 7, the change rate may be calculated based on an expression 8 shown below, for example (or the weight α may be set as the function of the change amount, and the change amount may be used instead of the change rate) similarly as described above.

$$D = \text{abs}[\{Gs(n)/Gh'(n-1)\} - 1] \qquad \text{[Expression 8]}$$

If the WB gain Gs(n) for the current frame n can be obtained, the correction hysteresis gain Gh'(n) to be applied to the current frame n can be calculated based on the above-described expression 6 using the correction hysteresis gain Gh'(n−1) used for the frame (n−1) before the current frame and the weight α.

When the correction hysteresis gain Gh'(n) is calculated, the microcomputer 30 performs control to cause the white balance correction section 34 to perform white balance correction for the frame n (for example, n=(n0+1), (n0+2), . . . ) using the correction hysteresis gain Gh'(n) instead of the hysteresis gain Gh(n) of the frame n. In response to such a control, the white balance correction section 34 performs the white balance correction for the frame n using the correction hysteresis gain Gh'(n) (step S13).

Subsequently, the light source color matching degree determination section 33 performs the light source color matching degree determination processing to determine whether or not the white balance of the image of the frame n is adjusted (whether or not the white balance matches the light source color) (step S14).

Then, it is determined whether or not the result of the determination processing by the light source color matching degree determination section 33 indicates that the white balance is already adjusted (step S15).

When it is determined that the white balance is already adjusted, the flag adj is set to 0 (step S15A). At this time, the microcomputer 30 performs control to stop the operation of the gain adjustment section 32.

Subsequently, the processing in the above-described step S16 is performed, and as a result, the adjusted-state indication 24a shown in FIG. 13 is superimposed on the frame image whose white balance has been adjusted in the step S13, and displayed on the LCD 24 which is the display section, for example.

Figure 14:
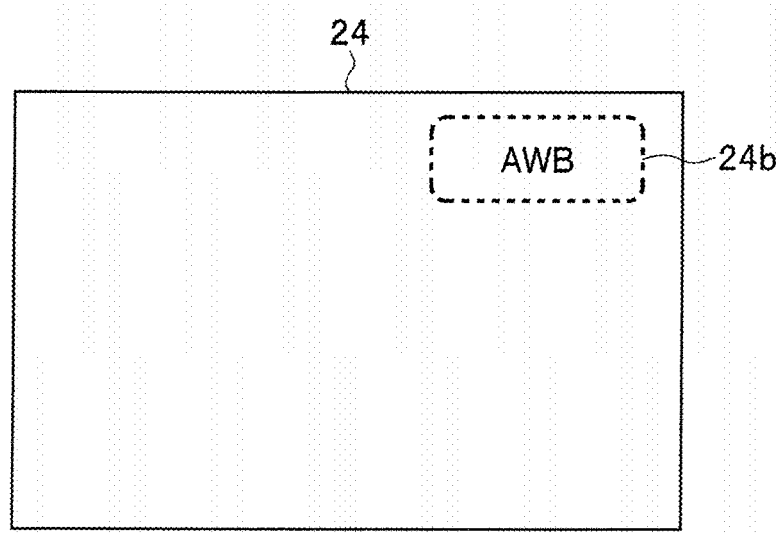
FIG. 14 is a view showing an example of an adjusting-state indication which indicates that the white balance is being adjusted in the first embodiment.
Figure 2:
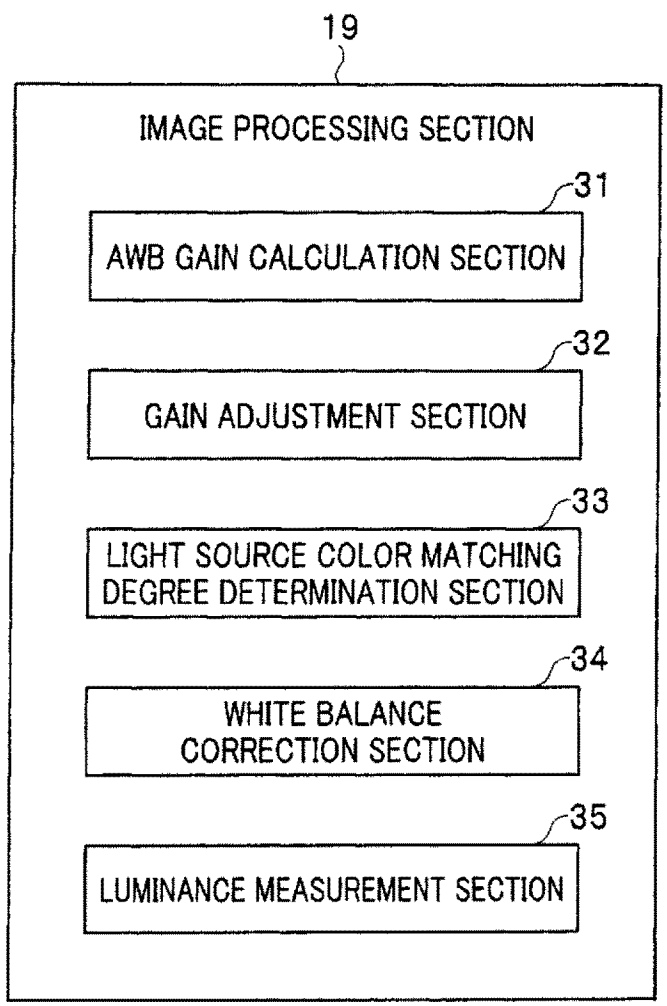
Figure 3:
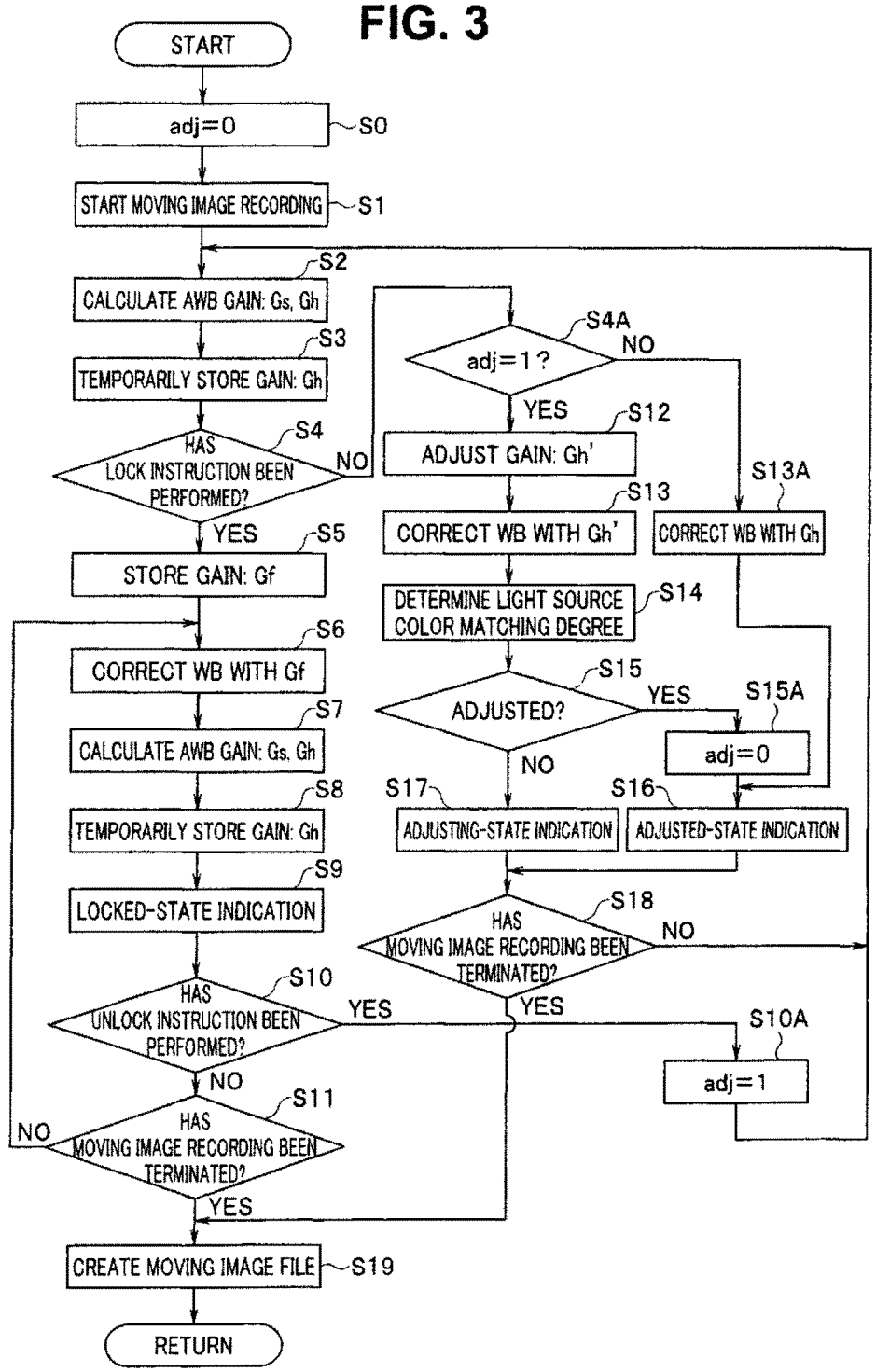
Figure 4:
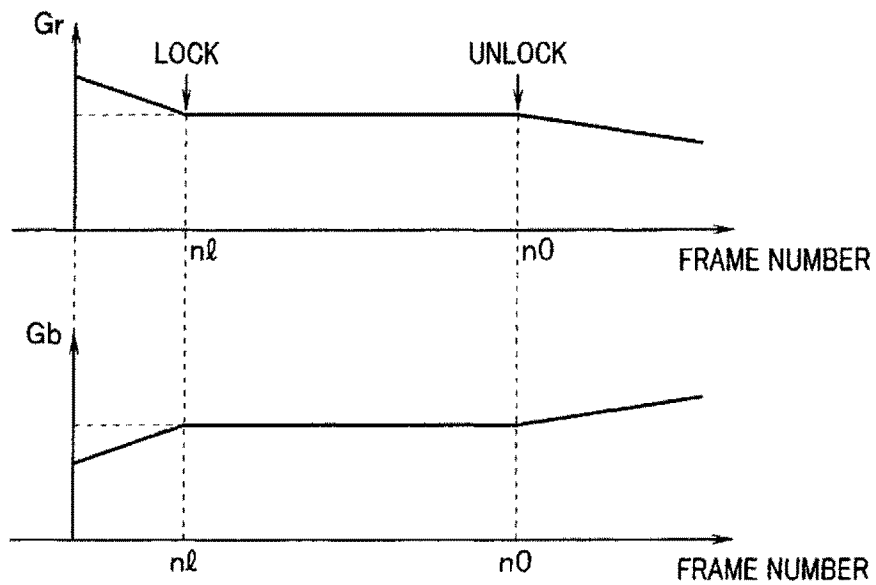
Figure 5:
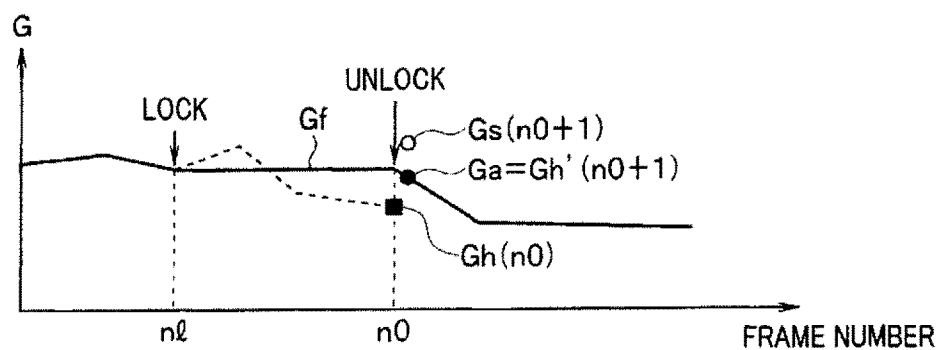
Figure 6:
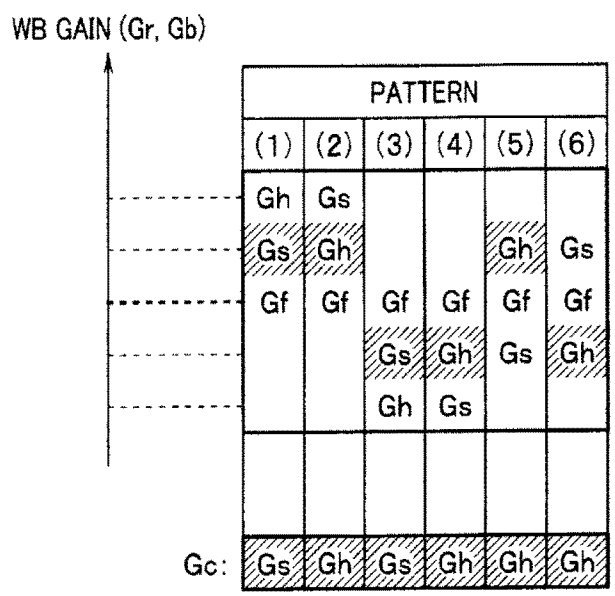
Figure 7:
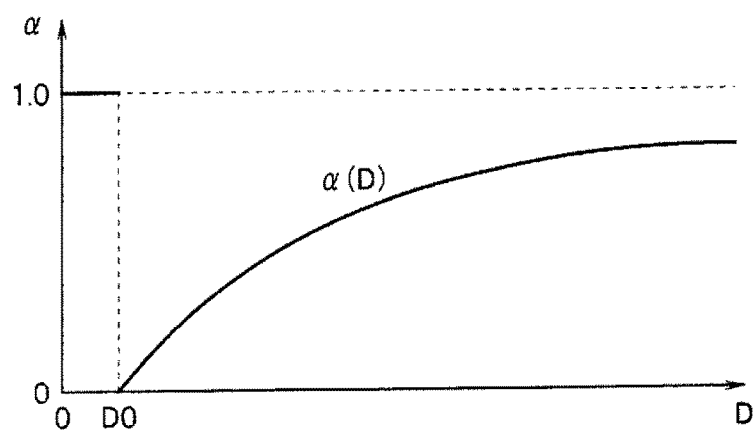
Figure 8:
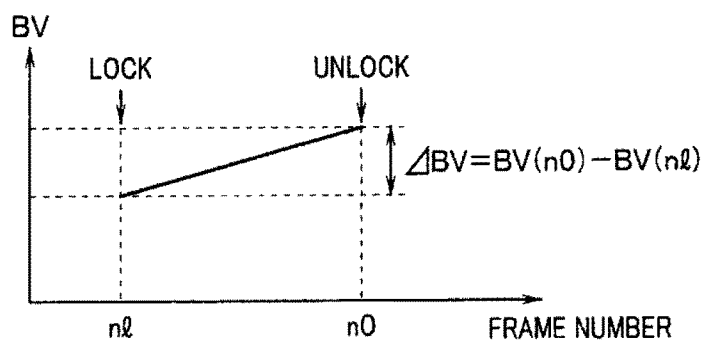
Figure 9:
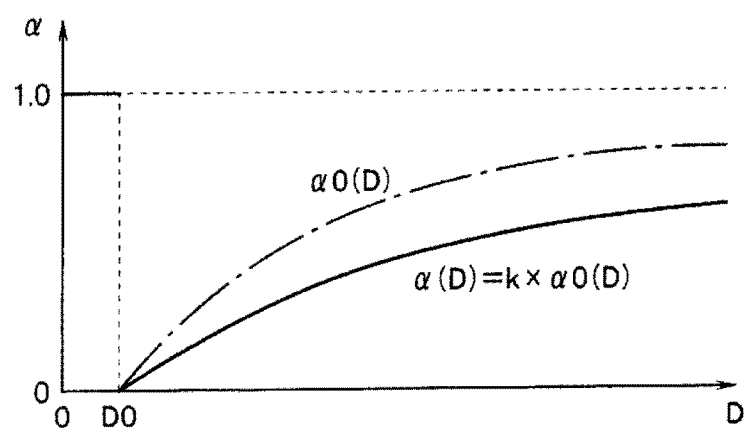
Figure 10:
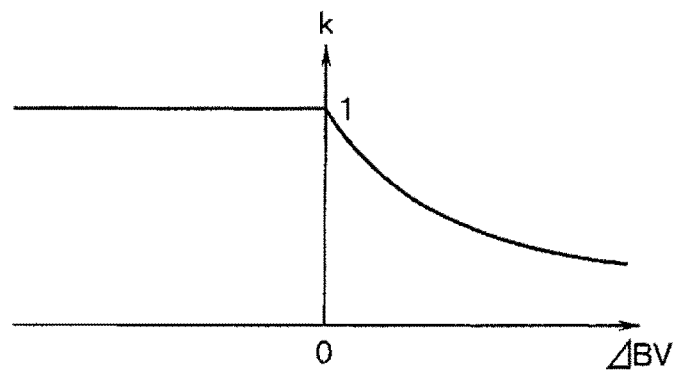
Figure 11:
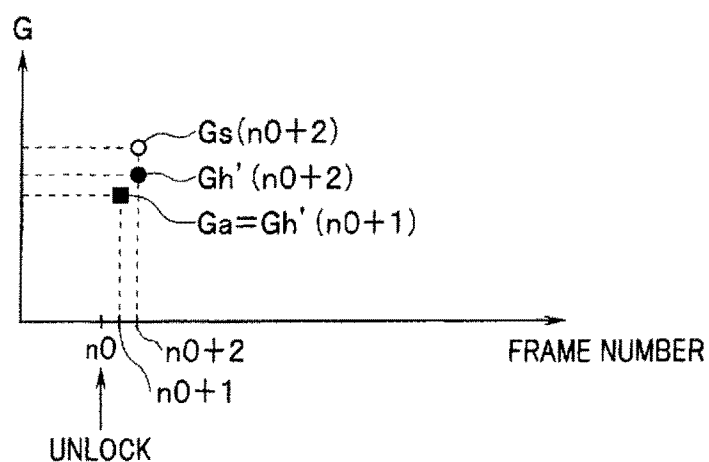
Figure 12:
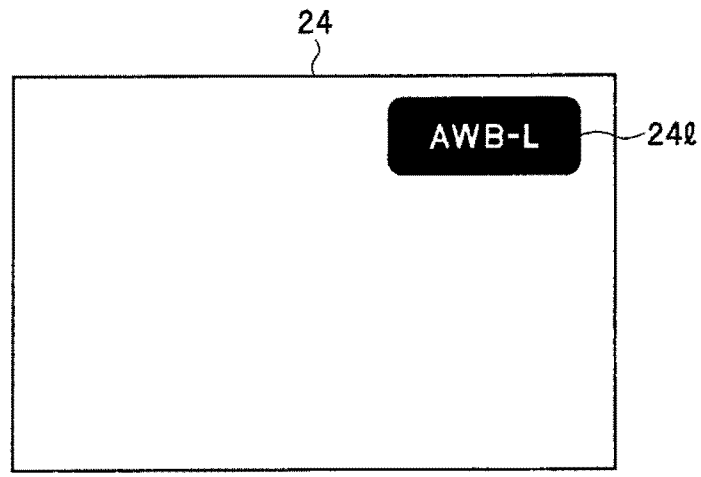
Figure 13:
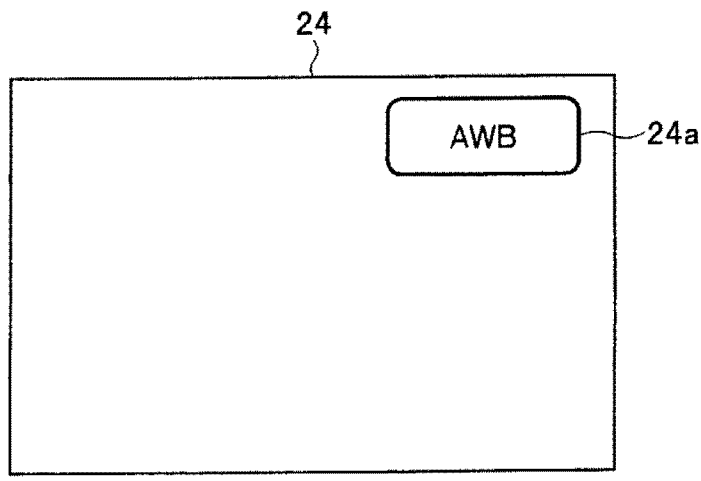
Figure 14:
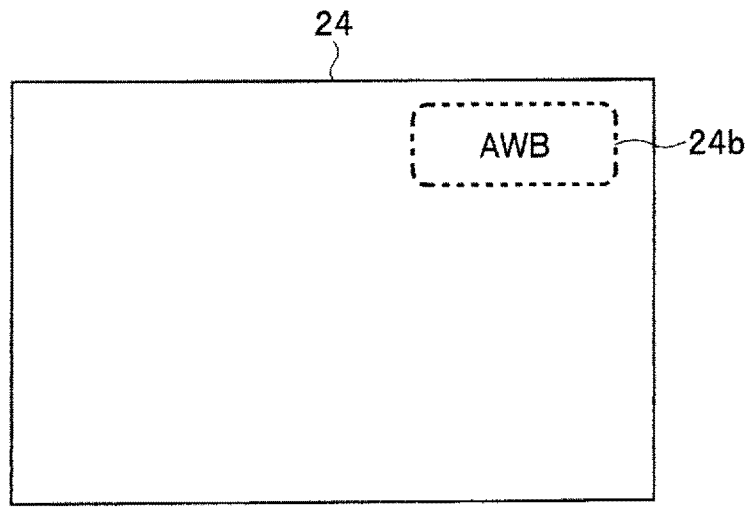

In addition, when it is determined that the white balance has not been adjusted yet and is being adjusted in the step S15, the adjusting-state indication 24b shown in FIG. 14 is superimposed on the frame image whose white balance has been adjusted in the step S13, and displayed on the LCD 24 which is the display section, for example (step S17). FIG. 14 is a view showing an example of the adjusting-state indication 24b which indicates that the white balance is being adjusted. The adjusting-state indication 24b indicates the adjusting state by blinking an indication same as the adjusted-state indication 24a at appropriate time intervals, for example.

Note that each of the indications shown in FIGS. 12 to 14 is one example and not limited thereto. It is needless to say that other indications may be used. In addition, the indications shown in FIGS. 12 to 14 may be configured such that on/off of the indications can be set by the user in a desired manner similarly as the display of various kinds of general information.

After the processing in the step S16 or S17 is performed, the above-described processing in the step S18 is performed, to determine whether or not the instruction for terminating the moving image recoding has been performed.

When it is determined that the instruction for terminating the moving image recording is not performed, the processing procedure returns to the step S2 and the processing as described above is performed. In this case, when it is determined that the white balance has not been adjusted yet in the step S15, the flag is maintained such that adj=1. Therefore, based on the determination in the step S4A, the processing procedure proceeds to the processing in step S12 (the processing in the adjusting period). On the other hand, when it is determined that the white balance is already adjusted in the step S15, the flag is set such that adj=0 in the step S15A. Therefore, based on the determination in the step S4A, the processing procedure proceeds to the processing in the step S13A (the processing in the normal period which is neither the lock period nor the adjusting period).

When it is determined that the instruction for terminating the moving image recording has been performed in the step S11 or S18, the microcomputer 30 adds a header and the like to the moving image data, and records the resulting moving image data in the recording medium 22 as the moving image file, through the memory I/F21 (step S19).

When recording the moving image file, the microcomputer 30 further performs control so as to record (in a file header, for example) the information indicating the timing at which the lock instruction has been performed, information indicating the timing at which the unlock instruction has been performed, and the fixed gain Gf (the gain Gr applied to the R component and the gain Gb applied to the B component), in association with the moving image.

The information indicating the timing at which the lock instruction has been performed and the information indicating the timing at which the unlock instruction has been performed may be a lock start frame number and a lock termination frame number, or may be a timecode indicating the lock start point and a timecode indicating the lock termination point.

Such information enables easy determination on which frame image of a plurality of frame images included in the moving image file is obtained during the lock of the white balance.

The moving image file is thus recorded, and thereafter the processing procedure returns from this processing to the main processing, not shown.

Note that description has been made above on the example in which the correction hysteresis gain Gh' is calculated after the lock period ends. However, the present invention is not limited to the example. The correction hysteresis gain Gh' does not have to be calculated in the adjusting period after the end of the lock period, but may be calculated when it is determined that the white balance does not match the light source color by the light source color matching degree determination section 33, or when it is determined that the matching degree between the white balance and the light source color is deviated by a predetermined value or more by the light source color matching degree determination section 33, for example. In such a case, the period after it is determined that the white balance does not match the light source color (or the color matching degree is deviated by the predetermined value or more) until it is determined again that the white balance matches the light source color by the light source color matching degree determination section 33 is the adjusting period.

In the above-described configuration, the gain adjustment is performed by the gain adjustment section 32 during the recording of the moving image. In addition to such gain adjustment, gain adjustment may be performed by the gain adjustment section 32 at the time of live view, for example (conversely, the gain adjustment by the gain adjustment section 32 may be turned off at the time of live view in order to reduce the power consumption).

With the first embodiment thus configured, after the unlock instruction is performed, the correction hysteresis gain Gh'(n) is calculated based on the expression 6, and the white balance correction is performed on the frame image by the white balance correction section 34 using the correction hysteresis gain Gh'(n). Such a configuration enables the white balance to follow the light source color in a short time after the gain for white balance is unlocked, while suppressing the flickering. As a result, it is possible to reduce a sense of incongruity against the dynamic change of the image.

When the unlock instruction is performed in the frame n0, the gain adjustment section 32 calculates the correction hysteresis gain Gh'(n0+1) based on the expression 1, which enables appropriate adjustment for bringing the white balance close to a desired white balance to be performed, while suppressing an extreme change of the white balance immediately after the unlock instruction.

In particular, the change amount of the white balance with respect to the fixed gain Gf that was being applied during the lock period can be effectively suppressed by selecting, as the selection gain Gc, one of the hysteresis gain Gh(n0) and the WB gain Gs(n0+1), the arrangement order of which is closer to the fixed gain Gf. In addition, when it is impossible to specify which of the arrangement orders of the hysteresis gain Gh(n0) and the WB gain Gs(n0+1) is closer to the fixed gain Gf, the hysteresis gain Gh(n0) is selected as the selection gain Gc in preference to the WB gain Gs(n0+1), which can effectively prevent the up-and-down fluctuation of the white balance in the unit of a frame.

Furthermore, the weight α is corrected within the range of 0 or more and 1 or less such that the greater the difference ΔBV between the object luminance before the lock period and the object luminance after the lock period, the smaller the value of the weight α with respect to the change rate D. Therefore, the flickering can be appropriately suppressed even when the sensitivity of the human's eyes to the change of the white balance becomes higher due to the increase of object luminance during the lock period.

When the weight α is corrected within the range of 0 or more and 1 or less such that the weight α with respect to the change rate D is changed in accordance with the input from the operation section, the user can desirably control the followability of the white balance.

In addition, when the change rate D is smaller than the predetermined change rate D0, setting is made such that α=1, which enables the flickering to be eliminated by suppressing the up-and-down fluctuation of the gain in the case where the change rate D is small.

Furthermore, the operation of the gain adjustment section 32 is stopped when the light source color matching degree determination section 33 determines that the white balance is already adjusted, which enables the processing load to be lightened and enables the power consumption to be reduced.

The locked-state indication 24*l* is displayed during the lock of the white balance, to thereby enable the user to visually and easily confirm that the white balance is locked.

In addition, the adjusting-state indication 24*b* is displayed when the white balance is being adjusted, to thereby enable the user to visually and easily confirm that the white balance is being adjusted.

The adjusted-state indication 24*a* is displayed when the white balance is already adjusted, to thereby enable the user to visually and easily confirm that the white balance is already adjusted.

Furthermore, the eye sensor 26 is used as the operation section for inputting lock instruction or the unlock instruction, which enables the input operation to be performed in a non-contact manner and prevents the image blur which is likely to occur in the case where the button operation is performed. In particular, in the camera in which the LCD 24 is used and the EVF 25 is hardly used at the time of moving image photographing, the eye sensor 26 can be used effectively.

At the time of moving image recording, the information indicating the timing at which the lock instruction has been performed, the information indicating the timing at which the unlock instruction has been performed, and the fixed gain Gf are recorded in association with the moving image. As a result, the frame obtained during the lock of the white balance can be easily discriminated at a desired time point after the moving image recording.

Note that the above-described sections may be configured as circuits. Arbitrary circuits may be mounted as a single circuit or as circuits by combining a plurality of circuits, as long as the circuit or circuits are capable of performing the functions same as those in the above-described embodiment. Furthermore, arbitrary circuits are not limited to those configured as dedicated circuits for performing intended functions, and may be configured to perform intended functions by causing a general-use circuit to execute a processing program.

Description has been made above mainly on the image processing apparatus. The present invention, however, may be an image processing method for performing control same as the control performed by the image processing apparatus, a computer program for causing a computer to execute processing same as the processing performed by the image processing apparatus, a non-transitory computer-readable medium storing the computer program, and the like.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An image processing apparatus comprising:
   an auto white balance gain calculation section that performs, for every frame, calculation of a white balance gain Gs of one frame constituting a moving image and calculation of a hysteresis gain Gh based on white balance gains Gs of a plurality of time-series frames;
   a white balance correction section that performs white balance correction using the hysteresis gain Gh;
   a control section that causes the white balance correction section to perform white balance correction using a fixed gain Gf, the fixed gain Gf being the hysteresis gain Gh at a time of a lock instruction, during a lock period after the lock instruction until an unlock instruction is performed; and
   a gain adjustment section that calculates a correction hysteresis gain Gh' by correcting the hysteresis gain Gh after the unlock instruction is performed, the gain adjustment section calculating, when a frame number is represented by an integer n according to time series, a correction hysteresis gain Gh'(n) for a frame n using a weight α of 0 or more and 1 or less, a value of the weight α becoming larger as a change rate D between a correction hysteresis gain Gh'(n−1) of a frame (n−1) and a white balance gain Gs(n) of the frame n becomes larger,
   wherein the control section controls the white balance correction section to cause the white balance correction section to perform white balance correction for the frame n using the correction hysteresis gain Gh'(n) instead of a hysteresis gain Gh(n) of the frame n.

2. The image processing apparatus according to claim 1, wherein the gain adjustment section calculates the correction hysteresis gain Gh'(n) using a following expression, $$Gh'(n)=\alpha \times Gh'(n-1)+(1-\alpha)\times Gs(n).$$

3. The image processing apparatus according to claim 1, wherein,
   in a case where the unlock instruction is performed in a frame n0 when the fixed gain Gf, a hysteresis gain Gh(n0), and a white balance gain Gs(n0+1) are arranged in an order of gain values, if the fixed gain Gf is not arranged between the hysteresis gain Gh(n0) and the white balance gain Gs(n0+1), the gain adjustment section selects one of the hysteresis gain Gh(n0) and the white balance gain Gs(n0+1), an arrangement order of which is closer to the fixed gain Gf, as a selection gain Gc, and if the fixed gain Gf is arranged between the hysteresis gain Gh(n0) and the white balance gain Gs(n0+1), the gain adjustment section selects the hysteresis gain Gh(n0) as the selection gain Gc, and calculates a correction hysteresis gain Gh'(n0+1) using the weight α of 0 or more and 1 or less, a value of the weight α becoming larger as a change rate D between the fixed gain Gf and the selection gain Gc becomes larger, and
   the control section controls the white balance correction section to cause the white balance correction section to perform white balance correction for a frame (n0+1) using the correction hysteresis gain Gh'(n0+1) instead of the hysteresis gain Gh(n0+1).

4. The image processing apparatus according to claim 3, wherein the gain adjustment section calculates the correction hysteresis gain Gh'(n0+1) using a following expression, $$Gh'(n0+1)=\alpha \times Gf+(1-\alpha)\times Gc.$$

5. The image processing apparatus according to claim 3, further comprising a luminance measurement section that measures an object luminance of the frames,
   wherein the gain adjustment section corrects the weight α within a range of 0 or more and 1 or less such that the larger a difference ΔBV obtained by subtracting an object luminance at the time of the lock instruction from an object luminance at the time of the unlock instruction, the smaller the value of the weight α with respect to the change rate D.

6. The image processing apparatus according to claim 3, further comprising an operation section that receives an operation input from a user,
   wherein the gain adjustment section corrects the weight α within a range of 0 or more and 1 or less such that the value of the weight α with respect to the change rate D changes in accordance with the input from the operation section.

7. The image processing apparatus according to claim 3, wherein the gain adjustment section performs setting such that α=1, when the change rate D is smaller than a predetermined change rate D0.

8. The image processing apparatus according to claim 1, further comprising a light source color matching degree determination section that determines, for every frame, whether or not the white balance is adjusted,
   wherein the control section performs control to stop an operation of the gain adjustment section, when the light source color matching degree determination section determines that the white balance is already adjusted.

9. The image processing apparatus according to claim 1, further comprising a display section that displays a locked-state indication for indicating that the white balance is locked in a frame for which the white balance correction is performed by the white balance correction section.

10. The image processing apparatus according to claim 9, further comprising a light source color matching degree determination section that determines, for every frame, whether or not the white balance is adjusted,
    wherein the display section displays an adjusting-state indication for indicating that the white balance is being adjusted, when the light source color matching degree determination section determines that the white balance is not adjusted.

11. The image processing apparatus according to claim 10, wherein the display section displays an adjusted-state indication for indicating that the white balance is already adjusted, when the light source color matching degree determination section determines that the white balance is already adjusted.

12. The image processing apparatus according to claim 1, further comprising an eye sensor that detects whether or not a proximate object exists, wherein the control section determines whether or not an eyepiece observation is performed based on whether or not existence of the proximate object is detected by the eye sensor when a still image photographing mode is set, and determines that an input of the lock instruction is performed by a user or an input of the unlock instruction is performed by the user based on a detection result by the eye sensor when a moving image photographing mode is set.

13. The image processing apparatus according to claim 1, wherein the control section further performs control of recording information indicating a timing of the lock instruction, information indicating a timing of the unlock instruction, and the fixed gain Gf in association with the moving image, when recording the moving image.

14. A non-transitory computer-readable medium storing a computer program for causing a computer to execute:
  an auto white balance gain calculation step of performing, for every frame, calculation of a white balance gain Gs of one frame constituting a moving image and calculation of a hysteresis gain Gh based on white balance gains Gs of a plurality of time-series frames;
  a white balance correction step of performing white balance correction using the hysteresis gain Gh;
  a control step of causing the white balance correction to be performed in the white balance correction step using a fixed gain Gf, the fixed gain Gf being the hysteresis gain Gh at a time of a lock instruction, during a lock period after the lock instruction until an unlock instruction is performed; and
  a gain adjustment step of calculating a correction hysteresis gain Gh' by correcting the hysteresis gain Gh after the unlock instruction is performed, wherein when a frame number is represented by an integer n according to time series, a correction hysteresis gain Gh'(n) for a frame n is calculated using a weight α of 0 or more and 1 or less, a value of the weight α becoming larger as a change rate D between a correction hysteresis gain Gh'(n−1) of a frame (n−1) and a white balance gain Gs(n) of the frame n becomes larger,
  wherein the control step is a step of controlling the white balance correction step such that white balance correction for the frame n is performed using the correction hysteresis gain Gh'(n) instead of a hysteresis gain Gh(n) of the frame n.

15. An image processing method comprising:
  an auto white balance gain calculation step of performing, for every frame, calculation of a white balance gain Gs of one frame constituting a moving image and calculation of a hysteresis gain Gh based on white balance gains Gs of a plurality of time-series frames;
  a white balance correction step of performing white balance correction using the hysteresis gain Gh;
  a control step of causing the white balance correction to be performed in the white balance correction step using a fixed gain Gf, the fixed gain Gf being the hysteresis gain Gh at a time of a lock instruction, during a lock period after the lock instruction until an unlock instruction is performed; and
  a gain adjustment step of calculating a correction hysteresis gain Gh' by correcting the hysteresis gain Gh after the unlock instruction is performed, wherein when a frame number is represented by an integer n according to time series, a correction hysteresis gain Gh'(n) for a frame n is calculated using a weight α of 0 or more and 1 or less, a value of the weight α becoming larger as a change rate D between a correction hysteresis gain Gh'(n−1) of a frame (n−1) and a white balance gain Gs(n) of the frame n becomes larger,
  wherein the control step is a step of controlling the white balance correction step such that white balance correction for the frame n is performed using the correction hysteresis gain Gh'(n) instead of a hysteresis gain Gh(n) of the frame n.

* * * * *

UNITED STATES PATENT AND TRADEMARK OFFICE
CERTIFICATE OF CORRECTION

PATENT NO.       : 10,021,362 B2
APPLICATION NO.  : 15/375334
DATED            : July 10, 2018
INVENTOR(S)      : Takasumi et al.

Page 1 of 23

It is certified that error appears in the above-identified patent and that said Letters Patent is hereby corrected as shown below:

Please delete Patent No. 10,021,362 B2 in its entirety and insert Patent No. 10,021,362 B2 in its entirety as shown on the attached pages.

Signed and Sealed this
Twenty-third Day of July, 2019

Andrei Iancu
*Director of the United States Patent and Trademark Office*

(12) United States Patent
Takasumi et al.

(10) Patent No.: US 10,021,362 B2
(45) Date of Patent: Jul. 10, 2018

(54) IMAGE PROCESSING APPARATUS, NON-TRANSITORY COMPUTER-READABLE MEDIUM STORING COMPUTER PROGRAM, AND IMAGE PROCESSING METHOD USING HYSTERESIS TO CALCULATE GAIN

(71) Applicant: Olympus Corporation, Hachioji-shi, Tokyo (JP)

(72) Inventors: Shinya Takasumi, Akiruno (JP); Tatsuya Kino, Kodaira (JP); Takuya Matsunaga, Akiruno (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/375,334

(22) Filed: Dec. 12, 2016

(65) Prior Publication Data
US 2017/0180620 A1 Jun. 22, 2017

(30) Foreign Application Priority Data
Dec. 22, 2015 (JP) .................. 2015-250035

(51) Int. Cl.
*H04N 9/73* (2006.01)
*H04N 5/232* (2006.01)

(52) U.S. Cl.
CPC ............ *H04N 9/735* (2013.01); *H04N 5/232* (2013.01)

(58) Field of Classification Search
CPC H04N 9/735; H04N 9/73; H04N 9/64; H04N 5/234
See application file for complete search history.

(56) References Cited

U.S. PATENT DOCUMENTS

| | | | |
|---|---|---|---|
| 7,330,206 B2 | 2/2008 | Nishimura | |
| 7,619,680 B1 * | 11/2009 | Bingle | B60R 11/04 348/342 |
| 8,054,346 B2 * | 11/2011 | Numata | H04N 5/217 348/222.1 |
| 8,558,949 B2 * | 10/2013 | Sato | H04N 5/145 345/591 |
| 9,788,394 B2 * | 10/2017 | Van Der Poel | H05B 37/0218 |
| 2003/0030743 A1 * | 2/2003 | Takahashi | H04N 5/235 348/362 |
| 2004/0201718 A1 * | 10/2004 | Poplin | H04N 5/235 348/222.1 |
| 2007/0081102 A1 * | 4/2007 | Ramanath | H04N 5/58 348/602 |

(Continued)

FOREIGN PATENT DOCUMENTS

JP  2003-348601  12/2003

*Primary Examiner* — Nicholas Giles
(74) *Attorney, Agent, or Firm* — John C. Pokotylo; Pokotylo Patent Services

(57) ABSTRACT

An image processing apparatus includes an AWB gain calculation section that calculates a WB gain Gs and a hysteresis gain Gh for every frame, a WB correction section that performs WB correction using Gh, a control section that causes the WB correction section to perform the WB correction using a fixed gain Gf during lock of white balance, and a gain adjustment section that weights and adds a WB gain Gs(n) and a correction hysteresis gain Gh'(n−1) to calculate a correction hysteresis gain Gh'(n) after unlock of the white balance, and the control section causes the WB correction section to perform WB correction for a frame n using Gh'(n).

15 Claims, 9 Drawing Sheets

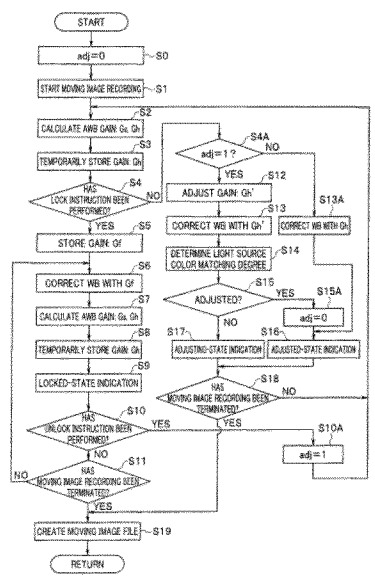

(56) References Cited

U.S. PATENT DOCUMENTS

| | | | |
|---|---|---|---|
| 2013/0113956 A1* | 5/2013 | Anderson | G06F 3/017 348/223.1 |
| 2016/0374176 A1* | 12/2016 | Van Der Poel | H05B 33/0872 |

* cited by examiner

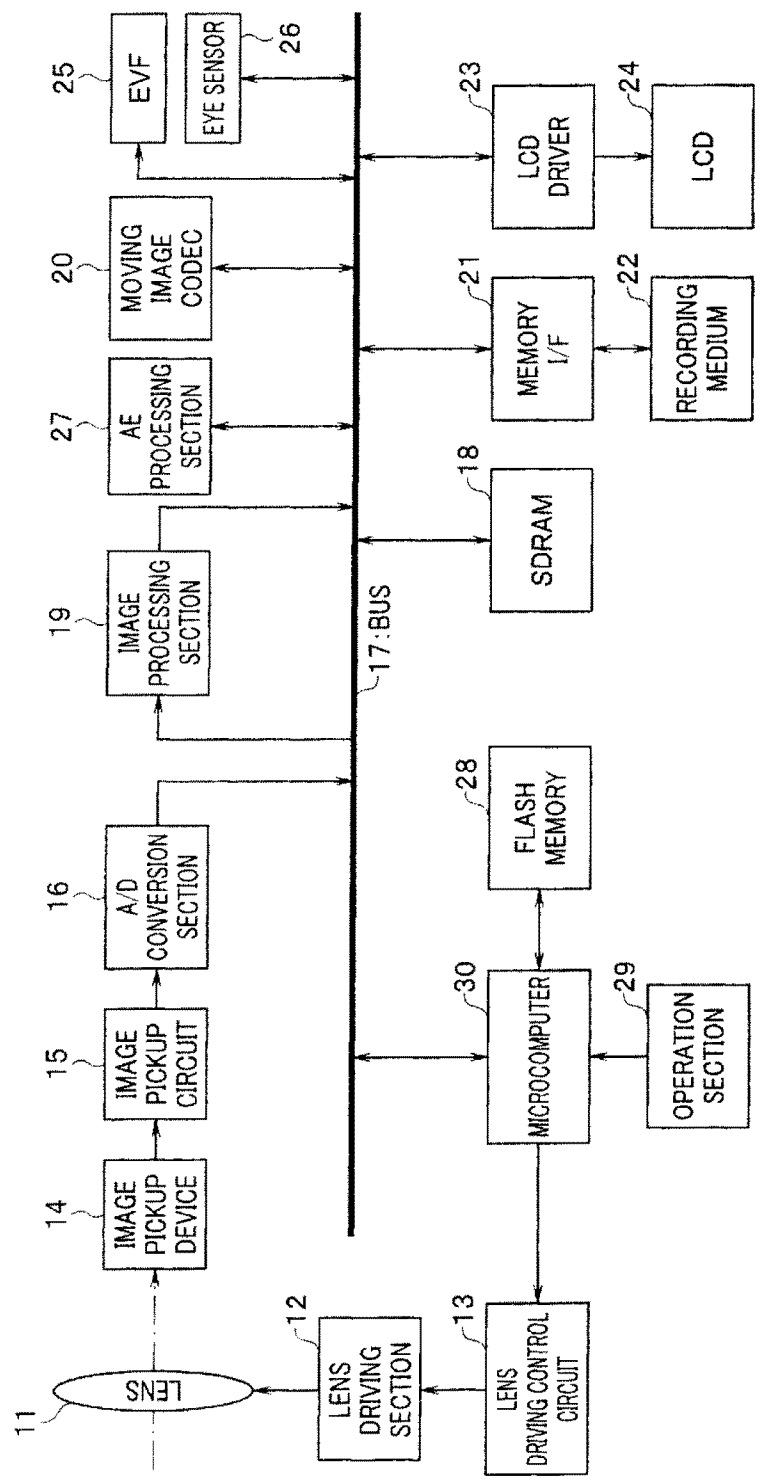

IMAGE PROCESSING APPARATUS, NON-TRANSITORY COMPUTER-READABLE MEDIUM STORING COMPUTER PROGRAM, AND IMAGE PROCESSING METHOD USING HYSTERESIS TO CALCULATE GAIN

CROSS REFERENCE TO RELATED APPLICATION

This application claims benefit of Japanese Application No. 2015-250035 filed in Japan on Dec. 22, 2015, the entire contents of which are incorporated herein by this reference.

BACKGROUND OF THE INVENTION

1. Field of the Invention

The present invention relates to an image processing apparatus, a non-transitory computer-readable medium storing a computer program, and an image processing method, for performing white balance correction of a moving image.

2. Description of the Related Art

Conventionally, auto white balance (AWB) processing for automatically correcting a white balance (WB) of a moving image has been performed. If an optimal WB gain is calculated in a unit of a frame and AWB processing is performed using the calculated WB gain, the color and brightness of an image change for each frame, and such change of the color and brightness is perceived as flickering, which makes the image difficult to see. In order to address such a problem, in the AWB processing, WB correction is performed using a hysteresis gain (WB gain having a value whose up-and-down fluctuation for each frame is suppressed) calculated based on WB gains of a plurality of frames.

Japanese Patent Application Laid-Open Publication No. 2003-348601, for example, discloses an auto white balance control method and an electronic camera in which after AWB processing is performed at the start of moving image photographing in a moving image photographing mode, a WB gain is fixed without executing periodic AWB processing during the moving image photographing, and an AE evaluation value is monitored and when the AE evaluation value fluctuates by a prescribed value or more, fixing of the WB gain is automatically released and the AWB processing is executed again. Such a technique is capable of reducing the processing load of a control section, which enables the cost of electronic cameras and the like to be reduced.

Although the technique disclosed in Japanese Patent Application Laid-Open Publication No. 2003-348601 is not intended to reduce flickering, the technique is expected to exhibit an effect of suppressing the flickering to be generated due to the fluctuation of the WB gain value for each frame. Furthermore, the technique is capable of setting a white balance suitable for each scene by automatically releasing the fixing of the WB gain depending on a change of a scene.

SUMMARY OF THE INVENTION

An image processing apparatus according to an aspect of the present invention includes: an auto white balance gain calculation section that performs, for every frame, calculation of a white balance gain Gs of one frame constituting a moving image and calculation of a hysteresis gain Gh based on white balance gains Gs of a plurality of time-series frames; a white balance correction section that performs white balance correction using the hysteresis gain Gh; a control section that causes the white balance correction section to perform white balance correction using a fixed gain Gf, the fixed gain Gf being the hysteresis gain Gh at a time of a lock instruction, during a lock period after the lock instruction until an unlock instruction is performed; and a gain adjustment section that calculates a correction hysteresis gain Gh' by correcting the hysteresis gain Gh after the unlock instruction is performed, the gain adjustment section calculating, when a frame number is represented by an integer n according to time series, a correction hysteresis gain Gh'(n) for a frame n using a weight α of 0 or more and 1 or less, a value of the weight α becoming larger as a change rate D between a correction hysteresis gain Gh'(n−1) of a frame (n−1) and a white balance gain Gs(n) of the frame n becomes larger, wherein the control section controls the white balance correction section to cause the white balance correction section to perform white balance correction for the frame n using the correction hysteresis gain Gh'(n) instead of a hysteresis gain Gh(n) of the frame n.

A non-transitory computer-readable medium storing a computer program according to an aspect of the present invention is a non-transitory computer-readable medium storing a computer program for causing a computer to execute: an auto white balance gain calculation step of performing, for every frame, calculation of a white balance gain Gs of one frame constituting a moving image and calculation of a hysteresis gain Gh based on white balance gains Gs of a plurality of time-series frames; a white balance correction step of performing white balance correction using the hysteresis gain Gh; a control step of causing the white balance correction to be performed in the white balance correction step using a fixed gain Gf, the fixed gain Gf being the hysteresis gain Gh at a time of a lock instruction, during a lock period after the lock instruction until an unlock instruction is performed; and a gain adjustment step of calculating a correction hysteresis gain Gh' by correcting the hysteresis gain Gh after the unlock instruction is performed, wherein when a frame number is represented by an integer n according to time series, a correction hysteresis gain Gh'(n) for a frame n is calculated using a weight α of 0 or more and 1 or less, a value of the weight α becoming larger as a change rate D between a correction hysteresis gain Gh'(n−1) of a frame (n−1) and a white balance gain Gs(n) of the frame n becomes larger, wherein the control step is a step of controlling the white balance correction step such that white balance correction for the frame n is performed using the correction hysteresis gain Gh'(n) instead of a hysteresis gain Gh(n) of the frame n.

An image processing method according to an aspect of the present invention includes: an auto white balance gain calculation step of performing, for every frame, calculation of a white balance gain Gs of one frame constituting a moving image and calculation of a hysteresis gain Gh based on white balance gains Gs of a plurality of time-series frames; a white balance correction step of performing white balance correction using the hysteresis gain Gh; a control step of causing the white balance correction to be performed in the white balance correction step using a fixed gain Gf, the fixed gain Gf being the hysteresis gain Gh at a time of a lock instruction, during a lock period after the lock instruction until an unlock instruction is performed; and a gain adjustment step of calculating a correction hysteresis gain Gh' by correcting the hysteresis gain Gh after the unlock instruction is performed, wherein when a frame number is represented by an integer n according to time series, a correction hysteresis gain Gh'(n) for a frame n is calculated using a weight α of 0 or more and 1 or less, a value of the weight α becoming larger as a change rate D between a correction hysteresis gain Gh'(n−1) of a frame (n−1) and a white balance gain Gs(n) of the frame n becomes larger, wherein the control step is a step of controlling the white balance correction step such that white balance correction for the frame n is performed using the correction hysteresis gain Gh'(n) instead of a hysteresis gain Gh(n) of the frame n.

BRIEF DESCRIPTION OF THE DRAWINGS

FIG. 1 is a block diagram showing a configuration of an image pickup apparatus to which an image processing apparatus according to a first embodiment of the present invention is applied.

FIG. 2 is a block diagram showing a configuration related to a white balance adjusting function of an image processing section according to the first embodiment.

FIG. 3 is a flowchart showing a working of the image pickup apparatus to which the image processing apparatus according to the first embodiment is applied.

FIG. 4 is a timing chart showing an example of a state of gain change during a lock period of a gain for white balance, and before and after the lock period in the first embodiment.

FIG. 5 is a diagram showing a state where an application gain for a frame immediately after unlock is calculated in the first embodiment.

FIG. 6 is a view for describing a selecting method of a selection gain to be used when the application gain for the frame immediately after the unlock is calculated in the first embodiment.

FIG. 7 is a diagram showing an example of a weight α to be used when a gain to be applied to an image is calculated in the first embodiment.

FIG. 8 is a diagram showing a state where a difference is generated between an object luminance at a time when a lock instruction is performed and an object luminance at a time when an unlock instruction is performed in the first embodiment.

FIG. 9 is a diagram showing a state where the weight α is changed with a coefficient k in the first embodiment.

FIG. 10 is a diagram showing an example in which the coefficient k for changing the weight α is changed according to a difference between the object luminance at the time when the lock instruction is performed and the object luminance at the time when the unlock instruction is performed in the first embodiment.

FIG. 11 is a diagram showing a state where a correction hysteresis gain to be applied to a frame next to the frame immediately after the unlock is calculated in the first embodiment.

FIG. 12 is a view showing an example of locked-state indication showing that the white balance is locked in the first embodiment.

FIG. 13 is a view showing an example of an adjusted-state indication which indicates that the white balance is already adjusted in the first embodiment.

FIG. 14 is a view showing an example of an adjusting-state indication which indicates that the white balance is being adjusted in the first embodiment.

DETAILED DESCRIPTION OF THE PREFERRED EMBODIMENT(S)

Hereinafter, an embodiment of the present invention will be described with reference to drawings.
[First Embodiment]

FIGS. 1 to 14 show the first embodiment of the present invention, and FIG. 1 is a block diagram showing a configuration of an image pickup apparatus to which an image processing apparatus is applied.

As shown in FIG. 1, the image pickup apparatus includes a lens 11, a lens driving section 12, a lens driving control circuit 13, an image pickup device 14, an image pickup circuit 15, an analog/digital conversion section (A/D conversion section) 16, a bus 17, an SDRAM 18, an image processing section 19, a moving image codec 20, a memory interface (memory I/F) 21, a recording medium 22, an LCD driver 23, an LCD 24, an electronic view finder (EVF) 25, an eye sensor 26, an AE processing section 27, a flash memory 28, an operation section 29, and a microcomputer 30.

The lens 11 is an image pickup optical system that forms an optical image of an object in an image pickup region of the image pickup device 14. The lens 11 includes a focus lens that adjusts the focus position (focal position) to perform focusing and an optical diaphragm for controlling the range of a luminous flux passing through the lens, for example.

The lens driving section 12 includes a driving source such as an actuator, and configured to cause the focus lens to move in the optical axis direction of the lens 11 and to cause the aperture diameter of the optical diaphragm to change.

Based on a command from the microcomputer 30, the lens driving control circuit 13 adjusts the focus position by driving the focus lens through the lens driving section 12, and adjusts a diaphragm value by driving the optical diaphragm.

The image pickup device 14 is an image pickup section that photoelectrically converts and picks up the optical image of the object formed by the lens 11 to generate an analog image signal, and outputs the generated analog image signal, and the image pickup device 14 is configured as a color image pickup device including a color filter of primary color Bayer array, for example.

The image pickup circuit 15 subjects the analog image signal read out from the image pickup device 14 to reduction process of reset noise and the like, then to waveform shaping process, and further to gain increase process to obtain a target brightness.

The A/D conversion section 16 converts the analog image signal outputted from the image pickup circuit 15 into a digital image signal (referred to as image data, as needed).

The bus 17 is a transfer path for transferring various kinds of data and control signals generated at a certain part in the image pickup apparatus to another part in the image pickup apparatus. The bus 17 according to the present embodiment is connected to the A/D conversion section 16, the SDRAM 18, the image processing section 19, the moving image codec 20, the memory I/F 21, the LCD driver 23, the EVF 25, the eye sensor 26, the AE processing section 27, and the microcomputer 30.

The image data outputted from the A/D conversion section 16 is transferred through the bus 17 to be temporarily stored in the SDRAM 18.

The SDRAM 18 is a storing section that temporarily stores various kinds of data such as the image data outputted from the A/D conversion section 16, the image data processed or being processed by the image processing section 19, the image data processed or being processed by the moving image codec 20, and the like.

The image processing section 19 performs various kinds of image processing on the image data, to create an image for displaying or recording. For example, the image processing section 19 performs image processing such as demosaicing processing, color reproduction processing, and noise reduction processing. Furthermore, the image processing section 19 includes a function as a white balance adjusting section that adjusts white balance of an image. The configuration and working related to the white balance adjusting function will be described later with reference to FIGS. 2, 3, etc.

The moving image codec 20 compresses and expands the moving image data with an appropriate processing method such as Motion JPEG or MPEG. Note that the moving image codec 20 may also function as a compression/expansion section for a still image, or a JPEG processing section and the like may be provided in addition to the moving image codec 20. After a header and the like are added to the moving image data processed by the moving image codec 20 by the microcomputer 30, the resulting moving image data is recorded as a moving image file in the recording medium 22 through the memory I/F 21.

The memory I/F 21 is a recording control section that performs control of recording the image data in the recording medium 22, and is configured to also read out the image data from the recording medium 22.

The recording medium 22 is a recording section that stores, in a non-volatile manner, the image data (moving image data, still image data, etc.) processed for recording by the image processing section 19, and is configured by a memory card attachable to and detachable from the image pickup apparatus, for example. Therefore, the recording medium 22 does not necessarily have a configuration unique to the image pickup apparatus.

The LCD driver 23 reads out the image data stored in the SDRAM 18 to convert the read-out image data into a video signal, and drives and controls the LCD 24 to cause the LCD 24 to display the image based on the video signal.

The LCD 24 is a display section that displays an image and various kinds of information related to the image pickup apparatus by being driven and controlled by the LCD driver 23, as described above.

The EVF 25 is for observing an image in a magnified manner through an eyepiece and the like, and is a display section that displays the image related to the image data and various kinds of information related to the image pickup apparatus.

The various kinds of information related to the image pickup apparatus displayed on the LCD 24 or the EVF 25 include an indication for indicating that the white balance is locked, being adjusted, or already adjusted.

The eye sensor 26 is disposed in the vicinity of the EVF 25, and is a sensor for detecting existence or non-existence of a proximate object. When a user performs eyepiece observation of the EVF 25, for example, the eye sensor 26 detects the existence of the proximate object (user's eyes). Furthermore, as described later, when the moving image photographing mode is set, the eye sensor 26 is also used as the operation section through which the user performs an operation for locking or unlocking the white balance.

The AE processing section 27 measures the object luminance based on the image data outputted from the A/D conversion section 16, to calculate a BV value in the APEX system, for example. The calculated BV value is used for automatic exposure (AE) control by the microcomputer 30, that is, the control of the optical diaphragm of the lens 11, the control of the exposure time by an optical shutter or an electronic shutter, the control of luminance gain based on the set ISO sensitivity, and the like.

The flash memory 28 is a storage medium that stores, in a non-volatile manner, a processing program (including an image processing program which is a program for executing the image processing method by the image processing apparatus) to be executed by the microcomputer 30 and various kinds of information related to the image pickup apparatus. As several examples of the information stored in the flash memory 28, a model name and production number for identifying the image pickup apparatus, parameters, tables, and functions, which are to be used for the image processing, or setting values set by the user, etc., can be listed, for example. The information stored in the flash memory 28 is read by the microcomputer 30.

The operation section 29 is a section through which various kinds of operation inputs to the image pickup apparatus are performed and includes a power source button for turning on and off the power source of the image pickup apparatus, a release button used for performing an image photographing instruction, a reproduction button for reproducing the recorded image, a menu button for performing setting and the like of the image pickup apparatus, operation buttons such as a cross key to be used for item selecting operation and an OK button to be used for determination operation of the selected item, and the like.

The release button is used for performing a still image photographing instruction, and also used for performing an instruction for starting or terminating the moving image recording, and configured as a two-stage operation button including, for example, a first release switch and a second release switch.

The items that can be set by using the menu button, the cross key, the OK button and the like include a photographing mode (still image photographing mode, moving image photographing mode, etc.), a recording mode (number of recording pixels, compression format, compression rate, etc.), a reproducing mode, and the like. When an operation is performed with respect to the operation section 29, a signal corresponding to the operation content is outputted to the microcomputer 30.

The microcomputer 30 is a control section that integrally controls the image pickup apparatus. When receiving an operation input by the user from the operation section 29 or a detection result from the eye sensor 26, the microcomputer 30 reads from the flash memory 28 the parameters and the like necessary for the processing, according to the processing program stored in the flash memory 28, and executes various kinds of sequences corresponding to the operation contents.

For example, when the still image photographing mode is set, the microcomputer 30 determines whether or not an eyepiece observation is performed based on whether or not the eye sensor 26 detects existence of a proximate object. In addition, when the moving image photographing mode is set, the microcomputer 30 determines that the lock instruction or the unlock instruction has been inputted by the user, based on the detection result by the eye sensor 26. In the present embodiment, the lock instruction is an instruction for fixing the gain for white balance, and the unlock instruction is an instruction for releasing the fixing of the gain for white balance.

Specifically, in the moving image photographing mode, it is detected that the lock instruction has been inputted when existence of a proximate object has been detected first, and it is detected that the unlock instruction has been inputted when the existence of the proximate object has been detected second time, by the user bringing an object such as his or her hand close to the eye sensor 26.

However, the method of inputting the instructions by using the eye sensor 26 is not limited to the above-described method. For example, when it is detected that the existence and non-existence of the proximate object has been continuously switched by the user waving his or her palm in the vicinity of the eye sensor 26, it may be detected that the lock instruction or the unlock instruction has been inputted. Such a configuration is capable of surely avoiding the malfunction that is likely to occur when an unintended object approaches the eye sensor 26.

The lock instruction or the unlock instruction can be inputted by the user not only with the eye sensor 26 but also with the button, switch, touch panel, or the like provided on the operation section 29. However, an image blur sometimes occurs when the button or the like is operated at the time of moving image photographing. Therefore, it is preferable to avoid such an image blur by using the eye sensor 26 that is capable of performing the lock instruction and the unlock instruction in non-contact manner.

Note that in the case where a remote controller is attached to the image pickup apparatus, the lock instruction and the unlock instruction may be inputted through the remote controller. Alternatively, the lock instruction and the unlock instruction may be inputted through a smart phone by installing an application for remotely operating the image pickup apparatus in the smart phone.

Next, FIG. 2 is a block diagram showing the configuration related to a white balance adjusting function of the image processing section 19.

The image processing section 19 includes an auto white balance (AWB) gain calculation section 31, a gain adjustment section 32, a light source color matching degree determination section 33, a white balance correction section 34, and a luminance measurement section 35, as the configuration related to the white balance adjusting function.

Though the white balance adjusting function of the image processing section 19 is used for both of a still image and a moving image, description will be made below by taking the case where the white balance adjusting function is mainly used for a moving image as an example.

The AWB gain calculation section 31 performs, for every frame, calculation of a white balance (WB) gain Gs of one frame constituting a moving image and calculation of a hysteresis gain Gh based on the WB gains Gs of a plurality of time-series frames.

That is, the AWB gain calculation section 31 calculates a gain Gr to be applied to an R component of the R, G, and B components that configure a color image and a gain Gb to be applied to a B component of the R, G, and B components. The reason why the gains are calculated only for the R component and the B component is to prevent G component, which is a component corresponding to the luminance, from changing (therefore, the gain Gg for the G component can be said that Gg=1), since it is sufficient to adjust the brightness of the image with another luminance adjustment circuit or the like. Hereinafter, the gains are just referred to as gain G, for example, as a representative of the gains Gr and Gb.

When calculating the gain G, the AWB gain calculation section 31 first calculates the WB gain Gs suitable for displaying a white object in the image of the one frame as white in color, based on the image data of one frame in the moving image data obtained in the unit of a frame. That is, when the frame number of the frame that constitutes the moving image data is represented with an integer n according to the time series, the AWB gain calculation section 31 calculates, for every frame, the WB gain Gs(n) for the n-th frame n.

Next, the AWB gain calculation section 31 calculates the hysteresis gain Gh(n) to be applied to the image data of the current frame n, based on the WB gain Gs(n) of the current frame n, and the WB gains Gs(n−1), Gs(n−2), . . . , of the one or more past frames n−1, n−2, . . . , for example.

As one example, the AWB gain calculation section 31 calculates the hysteresis gain Gh(n) of the current frame n, based on the WB gain Gs(n) of the current frame n and the hysteresis gain Gh(n−1) of the previous frame (n−1) (since the hysteresis gain Gh(n−1) is calculated using the WB gain Gs(n−1) of the previous frame (n−1), with the calculation method, the hysteresis gain Gh(n) of the current frame n is calculated based on the WB gains Gs of the current frame and one or more past frames). The calculation method of the hysteresis gain Gh is not limited to this example, and may be calculated with a publicly known appropriate calculation method. It is preferable to employ a method of following the change of the white balance in a photographing scene while suppressing the up-and-down fluctuation of the gain value for every frame.

The AWB gain calculation section 31 performs such calculation of the hysteresis gain Gh(n) for every frame also while the white balance is locked (the period during which the white balance is locked is referred to as a lock period, as needed).

The gain adjustment section 32 corrects the hysteresis gain Gh to be applied to the image to calculate a correction hysteresis gain Gh' after the unlock instruction is performed and the lock period of the white balance is terminated.

The gain adjustment section 32 adjusts the gain value during a period after the unlock instruction has been performed until the light source color matching degree determination section 33 determines that the white balance is already adjusted (hereinafter, referred to as adjusting period, as needed). That is, other than the adjusting period, the microcomputer 30 performs control of stopping the operation of the gain adjustment section 32. Such a control inhibits operation of the gain adjustment section 32, to thereby allow the processing load and power consumption to be reduced.

FIG. 4 is a timing chart showing an example of the state of the gain change during the lock period of the gain for white balance, and before and after the lock period. Note that the horizontal axis in FIG. 4 shows the lapse of time with the frame numbers.

The gains Gr, Gb change in accordance with the photographing scene until the frame n1 in which the lock instruction is performed by the microcomputer 30. Then, during the lock period from the frame n1 in which the lock instruction is performed until the frame n0 in which the unlock instruction is performed, the microcomputer 30 performs control of causing the white balance correction section 34 to correct the white balance using a fixed gain Gf, by setting the hysteresis gain at the time when the lock instruction is performed as the fixed gain Gf shown in FIG. 5. Therefore, the gains Gr, Gb of the frame n1 in which the lock instruction is performed are maintained until the frame n0 in which the unlock instruction is performed. In the frame after the frame n0, the gains Gr, Gb change again in accordance with the photographing scene.

As shown by the dotted line in FIG. 5, the AWB gain calculation section 31 calculates the hysteresis gain Gh(n) also during the lock period from the frame n1 to the frame n0. The hysteresis gain Gh(n0) of the frame n0 in which the unlock instruction is performed has a gain value different from the value of the fixed gain Gf which was being applied during the lock period, by a predetermined value (for example, a predetermined value with which a change of the color is recognized) or more in some cases. Therefore, if the hysteresis gain Gh is applied immediately after the unlock instruction has been performed, the white balance changes largely, and such a change is recognized as flickering.

In order to reduce the flickering, the gain adjustment section 32 adjusts the gain value of the hysteresis gain Gh, and with such adjustment, the correction hysteresis gain Gh' is calculated. Detailed description will be made later on how the gain adjustment section 32 calculates the correction hysteresis gain Gh'.

The light source color matching degree determination section 33 determines, for every frame, whether or not the white balance is already adjusted (the white balance matches the light source color). The light source color matching degree determination section 33 is capable of determining that the white balance matches the light source color when the temporal change of the gain for white balance applied to the frame image becomes small to be close to a certain value, for example. However, another appropriate method may be adopted to determine whether or not the white balance matches the light source color.

The white balance correction section 34 performs the white balance adjustment using the hysteresis gain Gh calculated by the AWB gain calculation section 31 during the period other than the lock period and the above-described adjusting period, based on the control by the microcomputer 30. In addition, the white balance correction section 34 performs the white balance adjustment using the fixed gain Gf during the lock period, based on the control by the microcomputer 30. Furthermore, the white balance correction section 34 performs the white balance adjustment using the correction hysteresis gain Gh' adjusted by the gain adjustment section 32 during the above-described adjusting period, based on the control by the microcomputer 30.

The luminance measurement section 35 measures the object luminance of the frame image. The measured object luminance is used for correcting the weight α to be used when calculating the correction hysteresis gain Gh', which will be described later with reference to FIGS. 8 to 10, etc.

Note that, when the image processing apparatus is applied to the image pickup apparatus, for example, the AE processing section 27 for measuring the object luminance is provided, as described above. Therefore, the luminance measurement section 35 may be omitted, and the object luminance measured by the AE processing section 27 may be used (in this case, the AE processing section 27 also serves as the luminance measurement section).

Next, FIG. 3 is a flowchart showing the working of the image pickup apparatus to which the image processing apparatus is applied. The processing shown in FIG. 3 is performed mainly as the operation of the sections including the image processing section 19 in the image pickup apparatus under the control by the microcomputer 30 that executes the processing program stored in the flash memory 28.

In the main processing, not shown, when the image pickup apparatus is set in the moving image photographing mode and live-view display is on the LCD 24, etc., if the start of moving image recording is instructed by a release button being pressed, for example, the processing is started and a flag adj to be used during the processing is initialized to 0 (step S0). Note that, in FIG. 3, the equal sign "=" is used in the same way as that in the programming. That is, "adj=" indicates that the value on the right side of the "=" is assigned to the flag adj, except for the case where the sign "?" is attached.

The flag adj indicates whether or not the present period is the adjusting period during which the gain value is being adjusted by the above-described gain adjustment section 32. When the flag adj is 0, the flag indicates that the present period is not the adjusting period, and when the flag adj is 1, the flag indicates that the present period is the adjusting period.

In addition, at the time of the initialization, the operation of the gain adjustment section 32 is stopped by the control by the microcomputer 30.

Then, the moving image recording is started (step S1).

As described above, every time the frame image constituting the moving image is obtained, the AWB gain calculation section 31 calculates the WB gain Gs related only to the obtained frame and the hysteresis gain Gh related to the obtained frame and the past frame (step S2).

The calculated hysteresis gain Gh is temporarily stored in the SDRAM 18, for example, (or may be stored in a memory section, not shown, in the image processing section 19 or the microcomputer 30, the same applies hereafter) based on the control by the microcomputer 30 (step S3).

Then, based on the instruction inputted by the user through the eye sensor 26 that functions as the operation section (or the operation section 29, the same applies hereafter), the microcomputer 30 determines whether or not the lock instruction for locking the white balance has been performed (step S4).

When it is determined that the lock instruction is not performed, determination is made on whether or not the flag adj is 1 (step S4A).

Immediately after the processing shown in FIG. 3 is started, for example, since the flag is set such that adj=0 in the above-described step S0, it is determined that the flag adj is not 1.

In this case, the white balance correction section 34 performs white balance correction for the frame n using the hysteresis gain Gh(n) (step S13A).

Then, an adjusted-state indication 24a as shown in FIG. 13 is superimposed on the frame image subjected to the white balance adjustment in the step S13A, to be displayed on the LCD 24 as the display section, for example (step S16).

FIG. 13 is a view showing an example of an adjusted-state indication 24a which indicates that the white balance is already adjusted. In the example of the indication shown in FIG. 13, the characters "AWB", which indicate that auto white balance execution mode is set, are displayed. However, the characters "–L", which indicate that the white balance is locked as shown in a locked-state indication 24l in FIG. 12 to be described later, are not added. Furthermore, the color of the characters and the background color of the character part are normal colors, unlike the inverted colors as shown in the locked-state indication 24l in FIG. 12.

After that, it is determined whether or not termination of the moving image recording has been instructed, based on whether or not the release button has been pressed again, for example (step S18).

When it is determined that termination of the moving image recording is not instructed, the processing procedure returns to step S2 and above-described processing is performed.

When the lock instruction is performed through the operation section such as the eye sensor 26, for example, while the loop processing of steps S2, S3, S4, S4A, S13A, S16, and S18 (the processing in the normal period which is neither the lock period nor the adjusting period) is performed, it is determined that the lock instruction has been performed in the above-described step S4.

In this case, if the gain adjustment section 32 is being operated, the processing in the lock period is started after the control of stopping the operation of the gain adjustment section 32 is performed by the microcomputer 30, and the latest hysteresis gain Gh of the gains obtained at the time when the lock instruction was performed is saved in the SDRAM 18, for example, as the fixed gain Gf (step S5).

Then, based on the control by the microcomputer 30, the white balance correction section 34 performs the white balance adjustment on the obtained frame image by using the fixed gain Gf (step S6).

On the other hand, as described above, even while the white balance is locked, the AWB gain calculation section 31 calculates the WB gain Gs and the hysteresis gain Gh (step S7), and the calculated hysteresis gain Gh is temporarily stored in the SDRAM 18, for example (step S8).

Subsequently, the frame image subjected to the white balance adjustment in the step S6 is displayed on the LCD 24 as the display section, for example. On the image displayed on the LCD 24, the locked-state indication 24l which indicates that the auto white balance is locked is superimposed, as shown in FIG. 12, with a superimposing function of the image processing section 19 based on the control by the microcomputer 30, for example (step S9).

FIG. 12 is a view showing an example of the locked-state indication 24l, which indicates that the white balance is locked. In the example of the indication shown in FIG. 12, the characters "-L" which indicate the locked state are added after the characters "AWB" which indicate the auto white balance execution mode is set, and the color of the characters and the background color of the character part are inverted with respect to the adjusted-state indication 24a in FIG. 13 described above.

After that, it is determined whether or not the unlock instruction has been performed through the operation section such as the eye sensor 26 (step S10).

When it is determined that the unlock instruction is not performed, determination is made on whether or not the termination of the moving image recording has been performed based on whether or not the release button has been pressed again, for example (step S11).

When it is determined that the termination of the moving image recording is not performed, the processing procedure returns to the step S6 and the processing as described above is performed.

On the other hand, when it is determined that the unlock instruction has been performed in the step S10, the flag adj is set to 1 (step S10A).

After that, the processing procedure returns to step S2 and the WB gain Gs and the hysteresis gain Gh are calculated, the hysteresis gain Gh is stored in the step S3, and the determination in step S4 is made.

If it is immediately after the determination that the unlock instruction has been performed in the step S10, determination is made that the lock instruction is not performed in the step S4. In this case, the processing in the step S4A is further performed, and determination is made whether or not the flag adj is 1.

If it is immediately after the unlock instruction has been performed, since setting is performed such that adj=1 in the above-described step S10A, it is determined that the flag adj is 1 in the step S4A.

Then, the processing in the adjusting period is started, and the microcomputer 30 starts the operation of the gain adjustment section 32 and the gain adjustment section 32 calculates the correction hysteresis gain Gh' (step S12).

Description is made here on the calculation processing of the correction hysteresis gain Gh' for the frame (n0+1) immediately after the unlock instruction has been performed, with reference to FIG. 5. FIG. 5 is a diagram showing a state where the application gain for the frame immediately after the unlock is calculated.

The hysteresis gain Gh(n) calculated also during the lock period shifts at the value different from the fixed gain Gf that is applied during the lock period, as shown with the dotted lines in FIG. 5. Therefore, if the hysteresis gain Gh(n) is applied as-is after the unlock instruction, flickering is recognized in some cases, as described above.

Therefore, based on the hysteresis gain Gh(n0) of the frame n0 in which the unlock instruction has been performed, the WB gain Gs(n0+1) of the frame (n0+1) immediately after the unlock, and the fixed gain Gf that was being applied during the lock period, the gain adjustment section 32 calculates the correction hysteresis gain Gh'(n0+1) that is an application gain Ga to be applied to the frame (n0+1), as shown below.

When calculating the correction hysteresis gain Gh'(n0+1), the gain adjustment section 32 sets either the hysteresis gain Gh(n0) or the WB gain Gs(n0+1) as a selection gain Gc.

FIG. 6 is a view for describing a selecting method of a selection gain Gc to be used when the application gain Ga for the frame immediately after the unlock is calculated. Note that illustration of the frame numbers are omitted in FIG. 6.

The gain adjustment section 32 arranges the fixed gain Gf, the hysteresis gain Gh(n0), and the WB gain Gs(n0+1) in the order of the gain values. Specifically, FIG. 6 shows patterns (1) to (6) that show in which order the hysteresis gain Gh(n0) and the WB gain Gs(n0+1) are arranged with the fixed gain Gf as a center.

The cases where the fixed gain Gf is not between the hysteresis gain Gh(n0) and the WB gain Gs(n0+1) are shown in the patterns (1) to (4). In such cases, one of the hysteresis gain Gh(n0) and the WB gain Gs(n0+1), the arrangement order of which is closer to the fixed gain Gf (the one to which hatching is added in FIG. 6), is selected as the selection gain Gc.

The cases where the fixed gain Gf is between the hysteresis gain Gh(n0) and the WB gain Gs(n0+1) are shown in the patterns (5) and (6). In such cases, the hysteresis gain Gh(n0) is selected as the selection gain Gc.

When the selection gain Gc is thus determined, the gain adjustment section 32 calculates the correction hysteresis gain Gh'(n0+1) with the weight $\alpha$ by using an expression 1 shown below.

$$Gh'(n0+1)=\alpha \times Gf+(1-\alpha) \times Gc \qquad \text{[Expression 1]}$$

The gain adjustment section 32 is configured to set the weight $\alpha$ to a value of 0 or more and 1 or less as shown in FIG. 7, based on a change rate D between the fixed gain Gf and the selection gain Gc. FIG. 7 is a diagram showing an example of the weight $\alpha$ to be used when a gain to be applied to an image is calculated.

One example of the method of calculating the change rate D is an expression 2 shown below.

$$D=\text{abs}\{1-(Gf/Gc)\} \qquad \text{[Expression 2]}$$

In the expression, it is shown that the abs takes an absolute value. However, the calculation method of the change rate D is not limited to the method employing the expression 2, and an expression 3 shown below may be employed, for example. In the expression 2, the difference (Gc−Gf) between the selection gain Gc and the fixed gain Gf is divided by the selection gain Gc. In the expression 3, the difference (Gc−Gf) is divided by the fixed gain Gf.

$$D=abs\{(Gc/Gf)-1\} \qquad \text{[Expression 3]}$$

The calculation method is not limited to these expressions, and the absolute value of the difference (Gc−Gf) can be used, for example. In this case, the value to be obtained is not the change rate but a change amount, and the weight α has only to be set as a function of the change amount.

When the change rate D is smaller than a predetermined change rate D0 (0≤D<D0), the gain adjustment section 32 performs setting such that α=1, as shown in FIG. 7. In this case, the correction hysteresis gain Gh'(n0+1) is calculated such that Gh'(n0+1)=Gf, based on the expression 1, and the fixed gain Gf is applied even in the period immediately after the unlock. This is because, when the change rate D between the fixed gain Gf and the selection gain Gc is small, it is determined that there is no need for substantially changing the gain, to prevent the up-and-down fluctuation of the white balance in the unit of a frame.

Furthermore, the gain adjustment section 32 performs setting such that α=0, when the change rate D becomes the predetermined change rate D0, and thereafter performs setting such that the weight α becomes larger as the change rate D becomes larger than the predetermined change rate D0 (that is, the weight α monotonously increases).

That is, α=0 is set when D=D0 such that it is determined that the gain is required to be changed when the change rate D is equal to or larger than the predetermined change rate D0 and the gain returns to an appropriate gain in possible smallest number of frames. However, when the change rate D is large, α(D) is increased so as to bring the value of α(D) close to 1 or an upper limit value α0 to be described next, to prevent the gain change amount between frames from being too large so that the change amount is within an appropriate range.

The upper limit of the weight α which monotonously increases when D0≤D may be set to 1.0 as the upper limit value of α itself, or a predetermined upper limit value α0 smaller than 1.0(0<α0<1) may be set and the weight α may be brought close to the upper limit value α0.

Furthermore, the monotonous increase of the weight α when D0≤D forms a smooth curve shape in the example shown in FIG. 7 or the example shown in FIG. 9 to be described later. However, polygonal lines configured by connecting linear segments may be used, for example, in order to reduce the calculation load when the weight α is calculated according to the change rate D. As a specific example, a polygonal line may be used, which is formed such that the weight α linearly increases from the point at which (D, α)=(D0, 0) to the point at which (D, α)=(D1, α0) satisfying D0<D1, and α takes a constant value of α=α0 when D1≤D.

Note that the weight α changes according to the change rate D, as described above. However, in addition to such a configuration, the weight α may be set so as to change, with another factor as a parameter.

Description will be made on the example in which the weight α is changed according to the change amount of the object luminance in the lock period, with reference to FIGS. 8 to 10.

FIG. 8 is a diagram showing a state where a difference is generated between the object luminance at the time when the lock instruction is performed and the object luminance at the time when the unlock instruction is performed.

The difference ΔBV, which indicates the change amount of the object luminance before and after the lock period, is calculated using an expression 4, shown below, where the object luminance measured by the luminance measurement section 35 (or the AE processing section 27, the same applies hereafter) for the image data of the frame n1 in which the lock instruction is performed is BV(n1) and the object luminance measured by the luminance measurement section 35 for the image data of the frame n0 in which the unlock instruction is performed is BV (n0).

$$\Delta BV=BV(n0)-BV(n1) \qquad \text{[Expression 4]}$$

The coefficient k depending on the difference ΔBV is calculated as shown in FIG. 10, for example. FIG. 10 is a diagram showing an example in which the coefficient k for changing the weight α is changed according to the difference ΔBV between the object luminance at the time when the lock instruction is performed and the object luminance at the time when the unlock instruction is performed.

In the example shown in FIG. 10, when the difference ΔBV is negative, with the coefficient k set as the function of the difference ΔBV, that is, the object luminance decreases before and after the lock period (ΔBV<0), the coefficient k takes a value of 1, and when the difference ΔBV is positive, the coefficient monotonously decreases from 1, as the difference ΔBV becomes larger. The coefficient k is maintained at 1 when ΔBV<0, and decreased only when 0<ΔBV. The reason is that human eyes have characteristics more sensitive to the change of color when the color of the object changes to a bright color than when the color of the object changes to a dark color.

The weight α(D) is changed by using the coefficient k thus set. FIG. 9 is a diagram showing a state where the weight α is changed with the coefficient k.

In the example shown in FIG. 9, a basic weight α0(D) is prepared in advance and stored in the flash memory 28, for example, and the gain adjustment section 32 calculates the coefficient k from the difference ΔBV, to calculate the weight α(D) by multiplying the basic weight α0(D) by k within the range of D0≤D, as shown in an expression 5, for example.

$$\alpha(D)=k\times\alpha 0(D) \qquad \text{[Expression 5]}$$

The gain adjustment section 32 thus corrects the weight α within the range of 0 or more and 1 or less such that the greater the difference ΔBV, the smaller the value of the weight α with respect to the change rate D.

The gain adjustment section 32 causes the coefficient k with which the value of the weight α with respect to the change rate D is changed to automatically change according to the difference ΔBV between the luminance of the object before the lock period and the object luminance after the lock period. However, the present invention is not limited to such a configuration, and the coefficient k may be changed in accordance with the operation input from the user through the operation section, for example.

For example, when the unlock instruction is performed by depression operation of the unlock instruction button of the operation section 29, the coefficient k may be changed depending on how much longer the depression time ΔT of the unlock instruction button is than a predetermined shortest depression time ΔT0 (i.e., ΔT−ΔT0), that is, the coefficient k may be changed as the function k(ΔT−ΔT0) of the depression time extension amount (ΔT−ΔT0).

Alternatively, a pressure detection section may be provided to the unlock instruction button, and the coefficient k may be changed depending on how much greater a depression pressure P of the unlock instruction button is than a predetermined minimum depression pressure P0 (i.e., P–P0), that is, the coefficient k may be changed as the function k(P–P0) of the depression pressure increase amount (P–P0).

Note that the weight α(D) shown in FIG. 7, the basic weight α0(D) shown in FIG. 9, and the coefficient k shown in FIG. 10 may be stored in advance in the flash memory 28 as functions, or only specific points of the functions may be stored in a table or the like, for example, and a value of the point closest to a desired point may be used, or the value of the desired point may be calculated by interpolation calculation.

Next, with reference to FIG. 11, description is made on the correction hysteresis gain Gh' calculated by the gain adjustment section 32 during a period which is in the frame (n0+2) next to the frame immediately after the unlock or the frames subsequent to the frame (n0+2) and which is the adjusting period until it is determined that white balance matches the light source color (white balance is already adjusted) in the step S14 (or further in the step S15).

FIG. 11 is a diagram showing a state where the correction hysteresis gain Gh'(n0+2) to be applied to the frame (n0+2) next to the frame immediately after the unlock is calculated.

When the frame numbers of the frames subsequent to the frame immediately after the unlock are supposed such that n=(n0+2), (n0+3), . . . , the gain adjustment section 32 calculates the correction hysteresis gain Gh'(n) for the frame n by using the weight α (see FIG. 7, for example) of 0 or more and 1 or less, as described above, based on an expression 6 shown below.

$$Gh'(n) = \alpha \times Gh'(n-1) + (1-\alpha) \times Gs(n) \qquad [\text{Expression 6}]$$

Note that FIG. 11 shows the state where n=(n0+2).

However, in this case, the change rate D with which the value of the weight α is changed is the change rate between the correction hysteresis gain Gh'(n–1) of the frame (n–1) which is one frame before the current frame n and the WB gain Gs(n) of the current frame n, and calculated based on an expression 7 shown below, for example.

$$D = \text{abs}|1 - \{Gh'(n-1)\}| \qquad [\text{Expression 7}]$$

Alternatively, instead of the expression 7, the change rate may be calculated based on an expression 8 shown below, for example (or the weight α may be set as the function of the change amount, and the change amount may be used instead of the change rate) similarly as described above.

$$D = \text{abs}|\{Gs(n)/Gh'(n-1)\} - 1| \qquad [\text{Expression 8}]$$

If the WB gain Gs(n) for the current frame n can be obtained, the correction hysteresis gain Gh'(n) to be applied to the current frame n can be calculated based on the above-described expression 6 using the correction hysteresis gain Gh'(n–1) used for the frame (n–1) before the current frame and the weight α.

When the correction hysteresis gain Gh'(n) is calculated, the microcomputer 30 performs control to cause the white balance correction section 34 to perform white balance correction for the frame n (for example, n=(n0+1), (n0+2), . . . ) using the correction hysteresis gain Gh'(n) instead of the hysteresis gain Gh(n) of the frame n. In response to such a control, the white balance correction section 34 performs the white balance correction for the frame n using the correction hysteresis gain Gh'(n) (step S13).

Subsequently, the light source color matching degree determination section 33 performs the light source color matching degree determination processing to determine whether or not the white balance of the image of the frame n is adjusted (whether or not the white balance matches the light source color) (step S14).

Then, it is determined whether or not the result of the determination processing by the light source color matching degree determination section 33 indicates that the white balance is already adjusted (step S15).

When it is determined that the white balance is already adjusted, the flag adj is set to 0 (step S15A). At this time, the microcomputer 30 performs control to stop the operation of the gain adjustment section 32.

Subsequently, the processing in the above-described step S16 is performed, and as a result, the adjusted-state indication 24a shown in FIG. 13 is superimposed on the frame image whose white balance has been adjusted in the step S13, and displayed on the LCD 24 which is the display section, for example.

In addition, when it is determined that the white balance has not been adjusted yet and is being adjusted in the step S15, the adjusting-state indication 24b shown in FIG. 14 is superimposed on the frame image whose white balance has been adjusted in the step S13, and displayed on the LCD 24 which is the display section, for example (step S17). FIG. 14 is a view showing an example of the adjusting-state indication 24b which indicates that the white balance is being adjusted. The adjusting-state indication 24b indicates the adjusting state by blinking an indication same as the adjusted-state indication 24a at appropriate time intervals, for example.

Note that each of the indications shown in FIGS. 12 to 14 is one example and not limited thereto. It is needless to say that other indications may be used. In addition, the indications shown in FIGS. 12 to 14 may be configured such that on/off of the indications can be set by the user in a desired manner similarly as the display of various kinds of general information.

After the processing in the step S16 or S17 is performed, the above-described processing in the step S18 is performed, to determine whether or not the instruction for terminating the moving image recoding has been performed.

When it is determined that the instruction for terminating the moving image recording is not performed, the processing procedure returns to the step S2 and the processing as described above is performed. In this case, when it is determined that the white balance has not been adjusted yet in the step S15, the flag is maintained such that adj=1. Therefore, based on the determination in the step S4A, the processing procedure proceeds to the processing in step S12 (the processing in the adjusting period). On the other hand, when it is determined that the white balance is already adjusted in the step S15, the flag is set such that adj=0 in the step S15A. Therefore, based on the determination in the step S4A, the processing procedure proceeds to the processing in the step S13A (the processing in the normal period which is neither the lock period nor the adjusting period).

When it is determined that the instruction for terminating the moving image recording has been performed in the step S11 or S18, the microcomputer 30 adds a header and the like to the moving image data, and records the resulting moving image data in the recording medium 22 as the moving image file, through the memory I/F21 (step S19).

When recording the moving image file, the microcomputer 30 further performs control so as to record (in a file header, for example) the information indicating the timing at which the lock instruction has been performed, information indicating the timing at which the unlock instruction has been performed, and the fixed gain Gf (the gain Gr applied to the R component and the gain Gb applied to the B component, in association with the moving image.

The information indicating the timing at which the lock instruction has been performed and the information indicating the timing at which the unlock instruction has been performed may be a lock start frame number and a lock termination frame number, or may be a timecode indicating the lock start point and a timecode indicating the lock termination point.

Such information enables easy determination on which frame image of a plurality of frame images included in the moving image file is obtained during the lock of the white balance.

The moving image file is thus recorded, and thereafter the processing procedure returns from this processing to the main processing, not shown.

Note that description has been made above on the example in which the correction hysteresis gain Gh' is calculated after the lock period ends. However, the present invention is not limited to the example. The correction hysteresis gain Gh' does not have to be calculated in the adjusting period after the end of the lock period, but may be calculated when it is determined that the white balance does not match the light source color by the light source color matching degree determination section 33, or when it is determined that the matching degree between the white balance and the light source color is deviated by a predetermined value or more by the light source color matching degree determination section 33, for example. In such a case, the period after it is determined that the white balance does not match the light source color (or the color matching degree is deviated by the predetermined value or more) until it is determined again that the white balance matches the light source color by the light source color matching degree determination section 33 is the adjusting period.

In the above-described configuration, the gain adjustment is performed by the gain adjustment section 32 during the recording of the moving image. In addition to such gain adjustment, gain adjustment may be performed by the gain adjustment section 32 at the time of live view, for example (conversely, the gain adjustment by the gain adjustment section 32 may be turned off at the time of live view in order to reduce the power consumption).

With the first embodiment thus configured, after the unlock instruction is performed, the correction hysteresis gain Gh'(n) is calculated based on the expression 6, and the white balance correction is performed on the frame image by the white balance correction section 34 using the correction hysteresis gain Gh'(n). Such a configuration enables the white balance to follow the light source color in a short time after the gain for white balance is unlocked, while suppressing the flickering. As a result, it is possible to reduce a sense of incongruity against the dynamic change of the image.

When the unlock instruction is performed in the frame n0, the gain adjustment section 32 calculates the correction hysteresis gain Gh'(n0+1) based on the expression 1, which enables appropriate adjustment for bringing the white balance close to a desired white balance to be performed, while suppressing an extreme change of the white balance immediately after the unlock instruction.

In particular, the change amount of the white balance with respect to the fixed gain Gf that was being applied during the lock period can be effectively suppressed by selecting, as the selection gain Gc, one of the hysteresis gain Gh(n0) and the WB gain Gs(n0+1), the arrangement order of which is closer to the fixed gain Gf. In addition, when it is impossible to specify which of the arrangement orders of the hysteresis gain Gh(n0) and the WB gain Gs(n0+1) is closer to the fixed gain Gf, the hysteresis gain Gh(n0) is selected as the selection gain Gc in preference to the WB gain Gs(n0+1), which can effectively prevent the up-and-down fluctuation of the white balance in the unit of a frame.

Furthermore, the weight $\alpha$ is corrected within the range of 0 or more and 1 or less such that the greater the difference $\Delta BV$ between the object luminance before the lock period and the object luminance after the lock period, the smaller the value of the weight $\alpha$ with respect to the change rate D. Therefore, the flickering can be appropriately suppressed even when the sensitivity of the human's eyes to the change of the white balance becomes higher due to the increase of object luminance during the lock period.

When the weight $\alpha$ is corrected within the range of 0 or more and 1 or less such that the weight $\alpha$ with respect to the change rate D is changed in accordance with the input from the operation section, the user can desirably control the followability of the white balance.

In addition, when the change rate D is smaller than the predetermined change rate D0, setting is made such that $\alpha=1$, which enables the flickering to be eliminated by suppressing the up-and-down fluctuation of the gain in the case where the change rate D is small.

Furthermore, the operation of the gain adjustment section 32 is stopped when the light source color matching degree determination section 33 determines that the white balance is already adjusted, which enables the processing load to be lightened and enables the power consumption to be reduced.

The locked-state indication 24l is displayed during the lock of the white balance, to thereby enable the user to visually and easily confirm that the white balance is locked.

In addition, the adjusting-state indication 24b is displayed when the white balance is being adjusted, to thereby enable the user to visually and easily confirm that the white balance is being adjusted.

The adjusted-state indication 24a is displayed when the white balance is already adjusted, to thereby enable the user to visually and easily confirm that the white balance is already adjusted.

Furthermore, the eye sensor 26 is used as the operation section for inputting lock instruction or the unlock instruction, which enables the input operation to be performed in a non-contact manner and prevents the image blur which is likely to occur in the case where the button operation is performed. In particular, in the camera in which the LCD 24 is used and the EVF 25 is hardly used at the time of moving image photographing, the eye sensor 26 can be used effectively.

At the time of moving image recording, the information indicating the timing at which the lock instruction has been performed, the information indicating the timing at which the unlock instruction has been performed, and the fixed gain Gf are recorded in association with the moving image. As a result, the frame obtained during the lock of the white balance can be easily discriminated at a desired time point after the moving image recording.

Note that the above-described sections may be configured as circuits. Arbitrary circuits may be mounted as a single circuit or as circuits by combining a plurality of circuits, as long as the circuit or circuits are capable of performing the functions same as those in the above-described embodiment. Furthermore, arbitrary circuits are not limited to those configured as dedicated circuits for performing intended functions, and may be configured to perform intended functions by causing a general-use circuit to execute a processing program.

Description has been made above mainly on the image processing apparatus. The present invention, however, may be an image processing method for performing control same as the control performed by the image processing apparatus, a computer program for causing a computer to execute processing same as the processing performed by the image processing apparatus, a non-transitory computer-readable medium storing the computer program, and the like.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An image processing apparatus comprising:
a processor having hardware, wherein the processor is configured to
perform, for every frame, calculation of a white balance gain Gs of one frame constituting a moving image and calculation of a hysteresis gain Gh based on white balance gains Gs of a plurality of time-series frames;
perform white balance correction using the hysteresis gain Gh;
perform white balance correction using a fixed gain Gf, the fixed gain Gf being the hysteresis gain Gh at a time of a lock instruction, during a lock period after the lock instruction until an unlock instruction is performed;
calculate a correction hysteresis gain Gh' by correcting the hysteresis gain Gh after the unlock instruction is performed;
calculate, when a frame number is represented by an integer n according to time series, a correction hysteresis gain Gh'(n) for a frame n using a weight $\alpha$ of 0 or more and 1 or less, a value of the weight $\alpha$ becoming larger as a change rate D between a correction hysteresis gain Gh'(n−1) of a frame (n−1) and a white balance gain Gs(n) of the frame n becomes larger; and
perform white balance correction for the frame n using the correction hysteresis gain Gh'(n) instead of a hysteresis gain Gh(n) of the frame n.

2. The image processing apparatus according to claim 1, wherein the processor is further configured to calculate the correction hysteresis gain Gh'(n) using a following expression, $$Gh'(n)=\alpha \times Gh'(n-1)+(1-\alpha)\times Gs(n).$$

3. The image processing apparatus according to claim 1, wherein
in a case where the unlock instruction is performed in a frame n0 when the fixed gain Gf, a hysteresis gain Gh(n0), and a white balance gain Gs(n0+1) are arranged in an order of gain values, if the fixed gain Gf is not arranged between the hysteresis gain Gh(n0) and the white balance gain Gs(n0+1), the processor is further configured to select one of the hysteresis gain Gh(n0) and the white balance gain Gs(n0+1), an arrangement order of which is closer to the fixed gain Gf, as a selection gain Gc, and if the fixed gain Gf is arranged between the hysteresis gain Gh(n0) and the white balance gain Gs(n0+1), the processor is further configured to select the hysteresis gain Gh(n0) as the selection gain Gc, and calculates a correction hysteresis gain Gh'(n0+1) using the weight $\alpha$ of 0 or more and 1 or less, a value of the weight $\alpha$ becoming larger as a change rate D between the fixed gain Gf and the selection gain Gc becomes larger, and
the processor is further configured to perform white balance correction for a frame (n0+1) using the correction hysteresis gain Gh'(n0+1) instead of the hysteresis gain Gh(n0+1).

4. The image processing apparatus according to claim 3, wherein the processor is further configured to calculate the correction hysteresis gain Gh'(n0+1) using a following expression, $$Gh'(n0+1)=\alpha \times Gf+(1-\alpha)\times Gc.$$

5. The image processing apparatus according to claim 3, wherein the processor is further configured to measure an object luminance of the frames, and
wherein the processor corrects the weight $\alpha$ within a range 0 or more and 1 or less such that the larger a difference $\Delta BV$ obtained by subtracting an object luminance at the time of the lock instruction from an object luminance at the time of the unlock instruction, the smaller the value of the weight $\alpha$ with respect to the change rate D.

6. The image processing apparatus according to claim 3, wherein the processor is further configured to receive an operation input from a user, and correct
the weight $\alpha$ within a range 0 or more and 1 or less such that the value of the weight $\alpha$ with respect to the change rate D changes in accordance with the operation input received.

7. The image processing apparatus according to claim 3, wherein the processor is further configured to perform setting such that $\alpha=1$, when the change rate D is smaller than a predetermined change rate D0.

8. The image processing apparatus according to claim 1, wherein the processor is further configured to determine, for every frame, whether or not the white balance is adjusted, and to perform
control to stop the calculation of a correction hysteresis gain Gh'(n), when it is determined that the white balance is already adjusted.

9. The image processing apparatus according to claim 1, further comprising a display, wherein the processor is further configured to cause the display to display a locked-state indication for indicating that the white balance is locked in a frame for which the white balance correction is performed.

10. The image processing apparatus according to claim 9, wherein the processor is further configured to determine, for every frame, whether or not the white balance is adjusted, and to cause the display to display
an adjusting-state indication for indicating that the white balance is being adjusted, when it is determined that the white balance is not adjusted.

11. The image processing apparatus according to claim 10, wherein the display displays an adjusted-state indication for indicating that the white balance is already adjusted, when it is determined that the white balance is already adjusted.

12. The image processing apparatus according to claim 1, further comprising an eye sensor that detects whether or not a proximate object exists,
wherein the processor is further configured to determine whether or not an eyepiece observation is performed based on whether or not existence of the proximate object is detected by the eye sensor when a still image photographing mode is set, and determines that an input of the lock instruction is performed by a user or an input of the unlock instruction is performed by the user based on a detection result by the eye sensor when a moving image photographing mode is set.

13. The image processing apparatus according to claim 1, wherein the processor is further configured to perform control of recording information indicating a timing of the lock instruction, information indicating a timing of the unlock instruction, and the fixed gain Gf in association with the moving image, when recording the moving image.

14. A non-transitory computer-readable medium storing a computer program for causing a computer to execute:
- an auto white balance gain calculation step of performing, for every frame, calculation of a white balance gain Gs of one frame constituting a moving image and calculation of a hysteresis gain Gh based on white balance gains Gs of a plurality of time-series frames;
- a white balance correction step of performing white balance correction using the hysteresis gain Gh;
- a control step of causing the white balance correction to be performed in the white balance correction step using a fixed gain Gf, the fixed gain Gf being the hysteresis gain Gh at a time of a lock instruction, during a lock period after the lock instruction until an unlock instruction is performed; and
- a gain adjustment step of calculating a correction hysteresis gain Gh' by correcting the hysteresis gain Gh after the unlock instruction is performed, wherein when a frame number is represented by an integer n according to time series, a correction hysteresis gain Gh'(n) for a frame n is calculated using a weight α of 0 or more and 1 or less, a value of the weight α becoming larger as a change rate D between a correction hysteresis gain Gh'(n−1) of a frame (n−1) and a white balance gain Gs(n) of the frame n becomes larger,
- wherein the control step is a step of controlling the white balance correction step such that white balance correction for the frame n is performed using the correction hysteresis gain Gh'(n) instead of a hysteresis gain Gh(n) of the frame n.

15. An image processing method comprising:
- an auto white balance gain calculation step of performing, for every frame, calculation of a white balance gain Gs of one frame constituting a moving image and calculation of a hysteresis gain Gh based on white balance gains Gs of a plurality of time-series frames;
- a white balance correction step of performing white balance correction using the hysteresis gain Gh;
- a control step of causing the white balance correction to be performed in the white balance correction step using a fixed gain Gf, the fixed gain Gf being the hysteresis gain Gh at a time of a lock instruction, during a lock period after the lock instruction until an unlock instruction is performed; and
- a gain adjustment step of calculating a correction hysteresis gain Gh' by correcting the hysteresis gain Gh after the unlock instruction is performed, wherein when a frame number is represented by an integer n according to time series, a correction hysteresis gain Gh'(n) for a frame n is calculated using a weight α of 0 or more and 1 or less, a value of the weight α becoming larger as a change rate D between a correction hysteresis gain Gh'(n−1) of a frame (n−1) and a white balance gain Gs(n) of the frame n becomes larger,
- wherein the control step is a step of controlling the white balance correction step such that white balance correction for the frame n is performed using the correction hysteresis gain Gh'(n) instead of a hysteresis gain Gh(n) of the frame n.

* * * * *